US 11,430,992 B2

United States Patent
Annaka et al.

(10) Patent No.: US 11,430,992 B2
(45) Date of Patent: Aug. 30, 2022

(54) COMPOSITION FOR NON-AQUEOUS SECONDARY BATTERY FUNCTIONAL LAYER INCLUDING FIRST ORGANIC PARTICLES, SECOND ORGANIC PARTICLES AND SOLVENT, FUNCTIONAL LAYER FOR NON-AQUEOUS SECONDARY BATTERY, AND NON-AQUEOUS SECONDARY BATTERY

(71) Applicant: ZEON CORPORATION, Tokyo (JP)

(72) Inventors: Koji Annaka, Tokyo (JP); Kazuki Asai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 234 days.

(21) Appl. No.: 16/650,865

(22) PCT Filed: Sep. 5, 2018

(86) PCT No.: PCT/JP2018/032878
§ 371 (c)(1),
(2) Date: Mar. 26, 2020

(87) PCT Pub. No.: WO2019/065130
PCT Pub. Date: Apr. 4, 2019

(65) Prior Publication Data
US 2020/0280072 A1    Sep. 3, 2020

(30) Foreign Application Priority Data
Sep. 28, 2017 (JP) .............................. JP2017-189129

(51) Int. Cl.
*H01M 4/60* (2006.01)
*H01M 4/36* (2006.01)
(Continued)

(52) U.S. Cl.
CPC ......... *H01M 4/604* (2013.01); *H01M 4/0404* (2013.01); *H01M 4/366* (2013.01);
(Continued)

(58) Field of Classification Search
CPC .... H01M 4/604; H01M 4/0404; H01M 4/366; H01M 4/621; H01M 10/0525;
(Continued)

(56) References Cited

U.S. PATENT DOCUMENTS

2014/0141314 A1 *  5/2014  Kaneda .................... B05D 1/18
429/144

FOREIGN PATENT DOCUMENTS

JP          4433509 B2 *  3/2010  ............. Y02E 60/10
JP       2013145763 A    7/2013
(Continued)

OTHER PUBLICATIONS

Machine translation of WO 2013/147006A1, Akiike Junnosuke, 2013 (Year: 2013).*
(Continued)

*Primary Examiner* — Kwang Han
(74) *Attorney, Agent, or Firm* — Kenja IP Law PC

(57) ABSTRACT

Provided is a composition for a non-aqueous secondary battery functional layer with which it is possible to form a functional layer that has excellent heat shrinkage resistance and adhesiveness after immersion in electrolyte solution and that can cause a non-aqueous secondary battery to display excellent cycle characteristics. The composition for a functional layer contains first organic particles, second organic particles, and a solvent. The first organic particles include a polyfunctional ethylenically unsaturated monomer unit in a proportion of not less than 20 mass % and not more than 90 mass %. The second organic particles include a nitrile group-containing monomer unit in a proportion of not less
(Continued)

than 20 mass % and not more than 80 mass % and a cross-linkable monomer unit in a proportion of not less than 0.1 mass % and not more than 10 mass %.

10 Claims, 1 Drawing Sheet

(51) Int. Cl.
   *H01M 4/62* (2006.01)
   *H01M 10/0568* (2010.01)
   *H01M 10/0569* (2010.01)
   *H01M 4/04* (2006.01)
   *H01M 10/0525* (2010.01)

(52) U.S. Cl.
   CPC ....... *H01M 4/621* (2013.01); *H01M 10/0525* (2013.01); *H01M 10/0568* (2013.01); *H01M 10/0569* (2013.01); *H01M 2300/0065* (2013.01)

(58) Field of Classification Search
   CPC ..... H01M 10/0568; H01M 2300/0065; H01M 4/139; H01M 50/414; H01M 50/446; H01M 50/449; H01M 50/461; H01M 4/13; H01M 50/403; H01M 50/443; H01M 50/409; H01M 4/62; H01M 10/052; H01M 2300/0025; H01M 10/0569; Y02E 60/10
   See application file for complete search history.

(56) References Cited

FOREIGN PATENT DOCUMENTS

| JP | 2015153638 A | 8/2015 | |
|----|--------------|--------|---|
| JP | 2017103034 A | 6/2017 | |
| WO | WO 2013/147006 A1 * | 10/2013 | .......... H01M 50/411 |
| WO | 2014103792 A1 | 7/2014 | |
| WO | 2016027715 A1 | 2/2016 | |

OTHER PUBLICATIONS

Machine translation of JP 4433509B2, Maeda et al., 2010 (Year: 2010).*

Mar. 31, 2020, International Preliminary Report on Patentability issued in the International Patent Application No. PCT/JP2018/032878.

Mar. 29, 2021, the Extended European Search Report issued by the European Patent Office in the corresponding European Patent Application No. 18862220.3.

Nov. 20, 2018, International Search Report issued in the International Patent Application No. PCT/JP2018/032878.

* cited by examiner

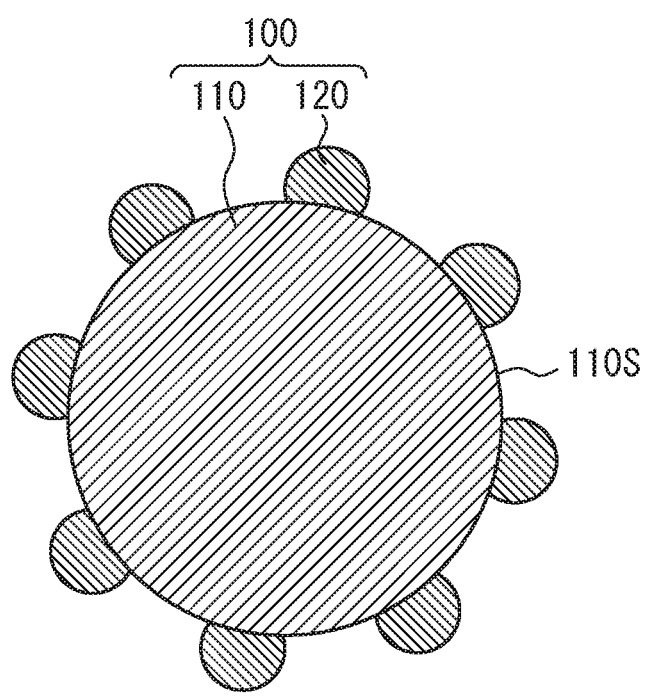

COMPOSITION FOR NON-AQUEOUS SECONDARY BATTERY FUNCTIONAL LAYER INCLUDING FIRST ORGANIC PARTICLES, SECOND ORGANIC PARTICLES AND SOLVENT, FUNCTIONAL LAYER FOR NON-AQUEOUS SECONDARY BATTERY, AND NON-AQUEOUS SECONDARY BATTERY

TECHNICAL FIELD

The present disclosure relates to a composition for a non-aqueous secondary battery functional layer, a functional layer for a non-aqueous secondary battery, and a non-aqueous secondary battery.

BACKGROUND

Non-aqueous secondary batteries (hereinafter, also simply referred to as "secondary batteries") such as lithium ion secondary batteries have characteristics such as compact size, light weight, high energy-density, and the ability to be repeatedly charged and discharged, and are used in a wide variety of applications.

A secondary battery generally includes battery components such as electrodes (positive electrode and negative electrode) and a separator that isolates the positive electrode and the negative electrode from one another and prevents short circuiting between the positive and negative electrodes. There are cases in which a porous membrane layer for improving heat resistance and strength, an adhesive layer aimed at improving adhesiveness between battery components, or the like is provided at the surface of an electrode and/or a separator (hereinafter, "functional layer" may be used as a general term for such layers). Specifically, an electrode that includes an electrode substrate obtained by forming an electrode mixed material layer on a current collector and that further includes a functional layer formed on the electrode substrate or a separator that includes a functional layer formed on a separator substrate may be used as a battery component.

Patent Literature (PTL) 1, for example, discloses a method for forming a protective layer that is disposed between a positive electrode and a negative electrode in an electrical accumulator by spraying, onto a substrate, a protective layer-forming composition that contains binder particles, filler particles, and a liquid medium, and in which a ratio of the average particle diameter of the binder particles and the average particle diameter of the filler particles is within a specific range, and then heating the protective layer-forming composition at a temperature within a specific range. According to PTL 1, by forming a protective layer using this method, uneven degradation in the protective layer surface can be inhibited, and charge/discharge characteristics of an electrical accumulator can be enhanced.

CITATION LIST

Patent Literature

PTL 1: JP 2015-153638 A

SUMMARY (Technical Problem)

In recent years, there has been demand for even higher secondary battery performance. Specifically, with regards to secondary batteries in which functional layer-containing battery components are used, there is demand for inhibiting functional layer heat shrinkage after immersion in electrolyte solution (i.e., increasing heat shrinkage resistance of a functional layer after immersion in electrolyte solution) so as to sufficiently inhibit short circuiting between positive and negative electrodes in high-temperature environments and further ensure secondary battery safety. Moreover, with regards to secondary batteries in which functional layer-containing battery components are used, there is also demand for good adhesion between battery components via a functional layer in electrolyte solution and further enhancement of battery characteristics such as cycle characteristics.

Accordingly, one objective of the present disclosure is to provide a composition for a non-aqueous secondary battery functional layer with which it is possible to form a functional layer that has excellent heat shrinkage resistance and adhesiveness after immersion in electrolyte solution and that can cause a non-aqueous secondary battery to display excellent cycle characteristics.

Another objective of the present disclosure is to provide a functional layer that has excellent heat shrinkage resistance and adhesiveness after immersion in electrolyte solution and that can cause a non-aqueous secondary battery to display excellent cycle characteristics, and also to provide a non-aqueous secondary battery including this functional layer.

(Solution to Problem)

The inventors conducted diligent investigation with the aim of solving the problems set forth above. The inventors discovered that by using a composition for a functional layer that contains: first organic particles including a polyfunctional ethylenically unsaturated monomer unit in a specific proportion; second organic particles including a cross-linkable monomer unit in a specific proportion and a nitrile group-containing monomer unit in a specific proportion; and a solvent, it is possible to form a functional layer that has excellent heat shrinkage resistance and adhesiveness after immersion in electrolyte solution and that can improve secondary battery cycle characteristics, and, in this manner, the inventors completed the present disclosure.

Specifically, the present disclosure aims to advantageously solve the problems set forth above by disclosing a composition for a non-aqueous secondary battery functional layer comprising first organic particles, second organic particles, and a solvent, wherein the first organic particles include a polyfunctional ethylenically unsaturated monomer unit in a proportion of not less than 20 mass % and not more than 90 mass %, and the second organic particles include a nitrile group-containing monomer unit in a proportion of not less than 20 mass % and not more than 80 mass % and a cross-linkable monomer unit in a proportion of not less than 0.1 mass % and not more than 10 mass %. By using a composition for a functional layer that contains a solvent, first organic particles including a polyfunctional ethylenically unsaturated monomer unit in a proportion within the range set forth above, and second organic particles including a nitrile group-containing monomer unit and a cross-linkable monomer unit in proportions within the ranges set forth above in this manner, it is possible to form a functional layer having excellent heat shrinkage resistance and adhesiveness after immersion in electrolyte solution, and it is possible to cause a secondary battery to display excellent cycle characteristics through use of a battery component that includes this functional layer.

Note that the phrase "includes a monomer unit" as used with respect to a component formed by a polymer, such as organic particles or a binder, in the present disclosure, means that "a repeating unit derived from the monomer is included in a polymer obtained using the monomer". Moreover, in a polymer that is produced through copolymerization of a plurality of types of monomers, the "fractional content of a monomer unit" formed through polymerization of a given monomer is normally, unless otherwise specified, the same as the ratio (charging ratio) of the given monomer among all monomers used in polymerization of the polymer. Furthermore, the "fractional content" of each "monomer unit" in a polymer can be measured by a nuclear magnetic resonance (NMR) method such as $^1$H-NMR or $^{13}$C-NMR.

In the presently disclosed composition for a non-aqueous secondary battery functional layer, a volume-average particle diameter $D_1$ of the first organic particles is preferably smaller than a volume-average particle diameter $D_2$ of the second organic particles. When the volume-average particle diameter $D_1$ of the first organic particles is smaller than the volume-average particle diameter $D_2$ of the second organic particles, heat shrinkage resistance and adhesiveness of a functional layer after immersion in electrolyte solution can be further improved.

Note that the "volume-average particle diameter" referred to in the present disclosure can be measured by a method described in the EXAMPLES section of the present specification.

In the presently disclosed composition for a non-aqueous secondary battery functional layer, the first organic particles preferably have a volume-average particle diameter $D_1$ of not less than 50 nm and not more than 370 nm. When the volume-average particle diameter $D_1$ of the first organic particles is within the range set forth above, heat shrinkage resistance of a functional layer after immersion in electrolyte solution can be further improved, and cycle characteristics of a secondary battery can be further enhanced.

In the presently disclosed composition for a non-aqueous secondary battery functional layer, the polyfunctional ethylenically unsaturated monomer unit is preferably a polyfunctional (meth)acrylic acid ester monomer unit. By using first organic particles including a polyfunctional (meth)acrylic acid ester monomer unit, heat shrinkage resistance of a functional layer after immersion in electrolyte solution can be further improved.

Note that in the present disclosure, "(meth)acryl" is used to indicate "acryl" and/or "methacryl".

In the presently disclosed composition for a non-aqueous secondary battery functional layer, the second organic particles preferably have a volume-average particle diameter $D_2$ of not less than 400 nm and not more than 1,000 nm. When the volume-average particle diameter $D_2$ of the second organic particles is within the range set forth above, secondary battery cycle characteristics can be further improved.

In the presently disclosed composition for a non-aqueous secondary battery functional layer, the second organic particles preferably have a core-shell structure including a core portion and a shell portion that at least partially covers an outer surface of the core portion. By using second organic particles having the core-shell structure set forth above, heat shrinkage resistance and adhesiveness of a functional layer after immersion in electrolyte solution can be further improved, and cycle characteristics of a secondary battery can be further enhanced.

In the presently disclosed composition for a non-aqueous secondary battery functional layer, the first organic particles preferably constitute a proportion of not less than 5 mass % and not more than 95 mass % among a total of the first organic particles and the second organic particles. When the proportion constituted by the first organic particles among the total of the first organic particles and the second organic particles is within the range set forth above, heat shrinkage resistance and adhesiveness of a functional layer after immersion in electrolyte solution can be further improved, and cycle characteristics of a secondary battery can be further enhanced.

Note that the presently disclosed composition for a non-aqueous secondary battery functional layer can further comprise inorganic particles.

The present disclosure also aims to advantageously solve the problems set forth above by disclosing a functional layer for a non-aqueous secondary battery formed using any one of the compositions for a non-aqueous secondary battery functional layer set forth above. A functional layer that is obtained using any one of the compositions for a functional layer set forth above in this manner has excellent heat shrinkage resistance and adhesiveness after immersion in electrolyte solution, and through a battery component that includes the functional layer, it is possible to cause a secondary battery to display excellent cycle characteristics.

The presently disclosed functional layer for a non-aqueous secondary battery preferably has a thickness of not less than 0.5 μm and not more than 1.5 μm. By using a functional layer that has a thickness within the range set forth above, it is possible to further improve heat shrinkage resistance of the functional layer after immersion in electrolyte solution and to further enhance cycle characteristics of a secondary battery.

The "thickness" of a functional layer referred to in the present disclosure can be measured by a method described in the EXAMPLES section of the present specification.

Moreover, by producing a secondary battery using a battery component that includes the presently disclosed functional layer for a non-aqueous secondary battery, it is possible to ensure adequate safety of the secondary battery while also achieving good adhesion between battery components via the functional layer, and causing the secondary battery to display excellent cycle characteristics.

(Advantageous Effect)

According to the present disclosure, it is possible to provide a composition for a non-aqueous secondary battery functional layer with which it is possible to form a functional layer that has excellent heat shrinkage resistance and adhesiveness after immersion in electrolyte solution and that can cause a non-aqueous secondary battery to display excellent cycle characteristics.

Moreover, according to the present disclosure, it is possible to provide a functional layer that has excellent heat shrinkage resistance and adhesiveness after immersion in electrolyte solution and that can cause a non-aqueous secondary battery to display excellent cycle characteristics, and also to provide a non-aqueous secondary battery including this functional layer.

BRIEF DESCRIPTION OF THE DRAWING

In the accompanying drawing,

FIG. 1 is a cross-sectional view schematically illustrating the structure of one example of a second organic particle contained in a presently disclosed composition for a functional layer for a case in which the second organic particle has a core-shell structure.

DETAILED DESCRIPTION

The following provides a detailed description of embodiments of the present disclosure.

The presently disclosed composition for a non-aqueous secondary battery functional layer can be used as a material in formation of the presently disclosed functional layer for a non-aqueous secondary battery. Moreover, the presently disclosed functional layer for a non-aqueous secondary battery is formed using the presently disclosed composition for a non-aqueous secondary battery functional layer and constitutes part of a separator or an electrode, for example. Furthermore, the presently disclosed non-aqueous secondary battery includes at least the presently disclosed functional layer for a non-aqueous secondary battery.

(Composition for Non-Aqueous Secondary Battery Functional Layer)

The presently disclosed composition for a functional layer is a composition that contains first organic particles, second organic particles, and a solvent, and that may optionally contain a binder and other components. The first organic particles contained in the presently disclosed composition for a functional layer include a polyfunctional ethylenically unsaturated monomer unit in a proportion of not less than 20 mass % and not more than 90 mass %. The second organic particles contained in the presently disclosed composition for a functional layer include a nitrile group-containing monomer unit in a proportion of not less than 20 mass % and not more than 80 mass % and a cross-linkable monomer unit in a proportion of not less than 0.1 mass % and not more than 10 mass %.

As a result of the presently disclosed composition for a functional layer containing first organic particles that include a polyfunctional ethylenically unsaturated monomer unit in a proportion of not less than 20 mass % and not more than 90 mass % and second organic particles that include a nitrile group-containing monomer unit in a proportion of not less than 20 mass % and not more than 80 mass % and a cross-linkable monomer unit in a proportion of not less than 0.1 mass % and not more than 10 mass %, a functional layer that is obtained from the composition for a functional layer has excellent heat shrinkage resistance and adhesiveness after immersion in electrolyte solution, and a secondary battery can be caused to display excellent cycle characteristics through use of a battery component including the functional layer.

<First Organic Particles>

The first organic particles are particles that are formed by a polymer and are a component that can mainly improve heat shrinkage resistance, strength, and so forth of a functional layer after immersion in electrolyte solution.

<<Chemical Composition>>

The first organic particles include a polyfunctional ethylenically unsaturated monomer unit in a proportion of not less than 20 mass % and not more than 90 mass % as described above, and also include repeating units other than the polyfunctional ethylenically unsaturated monomer unit (other repeating units) in a proportion of not less than 10 mass % and not more than 80 mass %.

[Polyfunctional Ethylenically Unsaturated Monomer Unit]

A monomer that includes two or more ethylenically unsaturated bonds per molecule (however, conjugated diene monomers such as 1,3-butadiene are excluded) is used as a polyfunctional ethylenically unsaturated monomer that can form the polyfunctional ethylenically unsaturated monomer unit referred to in the present disclosure.

Examples of polyfunctional ethylenically unsaturated monomers include:

polyfunctional (meth)acrylic acid ester monomers such as allyl (meth)acrylate, ethylene glycol di(meth)acrylate, diethylene glycol di(meth)acrylate, triethylene glycol di(meth) acrylate, tetraethylene glycol di(meth)acrylate, and trimethylolpropane tri(meth)acrylate;

polyfunctional aromatic vinyl monomers such as divinylbenzene and diisopropenylbenzene;

dipropylene glycol diallyl ether, polyglycol diallyl ether, triethylene glycol divinyl ether, hydroquinone diallyl ether, tetraallyloxyethane, trimethylolpropane diallyl ether, allyl and vinyl ethers of polyfunctional alcohols other than those listed above, triallylamine, and methylenebisacrylamide.

Note that in the present disclosure, "(meth)acrylate" is used to indicate "acrylate" and/or "methacrylate".

One of these polyfunctional ethylenically unsaturated monomers may be used individually, or two or more of these polyfunctional ethylenically unsaturated monomers may be used in combination. Of these polyfunctional ethylenically unsaturated monomers, polyfunctional (meth)acrylic acid ester monomers and polyfunctional aromatic vinyl monomers are preferable, polyfunctional (meth)acrylic acid ester monomers are more preferable, ethylene glycol dimethacrylate and trimethylolpropane trimethacrylate are even more preferable, and ethylene glycol dimethacrylate is particularly preferable from a viewpoint of further improving heat shrinkage resistance of a functional layer after immersion in electrolyte solution.

The fractional content of the polyfunctional ethylenically unsaturated monomer unit in the first organic particles when all repeating units of the polymer forming the first organic particles are taken to be 100 mass % is required to be not less than 20 mass % and not more than 90 mass %, is preferably 50 mass % or more, and more preferably 65 mass % or more, and is preferably 86.5 mass % or less, and more preferably 85 mass % or less. If the proportion constituted by the polyfunctional ethylenically unsaturated monomer unit in the first organic particles is less than 20 mass %, the first organic particles swell excessively in electrolyte solution due to reduction of the degree of cross-linking thereof, and heat shrinkage resistance of a functional layer after immersion in electrolyte solution is lost. On the other hand, if the proportion constituted by the polyfunctional ethylenically unsaturated monomer unit in the first organic particles is more than 90 mass %, fine particles increase due to reduction of polymerization stability in production of the first organic particles, and secondary battery cycle characteristics are lost.

[Other Repeating Units]

Examples of the other repeating units included in the organic particles include, but are not specifically limited to, a monofunctional (meth)acrylic acid ester monomer unit, a nitrile group-containing monomer unit, and an acidic group-containing monomer unit.

—Monofunctional (Meth)Acrylic Acid Ester Monomer Unit—

Examples of (meth)acrylic acid ester monomers that can form the monofunctional (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

One of these (meth)acrylic acid ester monomers may be used individually, or two or more of these (meth)acrylic acid ester monomers may be used in combination. Of these (meth)acrylic acid ester monomers, methyl acrylate, ethyl acrylate, n-butyl acrylate, 2-ethylhexyl acrylate, methyl methacrylate, ethyl methacrylate, n-butyl methacrylate, and 2-ethylhexyl methacrylate are preferable, and n-butyl acrylate is more preferable.

The fractional content of the monofunctional (meth) acrylic acid ester monomer unit in the first organic particles when all repeating units of the polymer forming the first organic particles are taken to be 100 mass % is preferably 10 mass % or more, and more preferably 12 mass % or more, and is preferably 35 mass % or less, and more preferably 30 mass % or less. When the proportion constituted by the monofunctional (meth)acrylic acid ester monomer unit in the first organic particles is 10 mass % or more, production of fine particles can be inhibited by ensuring polymerization stability in production of the first organic particles, and secondary battery cycle characteristics can be further improved. On the other hand, when the proportion constituted by the monofunctional (meth)acrylic acid ester monomer unit in the first organic particles is 35 mass % or less, excessive swelling of the first organic particles in electrolyte solution can be inhibited by ensuring the degree of crosslinking thereof, heat shrinkage resistance of a functional layer after immersion in electrolyte solution can be further improved, and cycle characteristics of a secondary battery can be further enhanced.

—Nitrile Group-Containing Monomer Unit—

Examples of nitrile group-containing monomers that can form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. One of these nitrile group-containing monomers may be used individually, or two or more of these nitrile group-containing monomers may be used in combination. Of these nitrile group-containing monomers, acrylonitrile and methacrylonitrile are preferable.

The fractional content of the nitrile group-containing monomer unit in the first organic particles when all repeating units of the polymer forming the first organic particles are taken to be 100 mass % is preferably 0.1 mass % or more, and more preferably 0.5 mass % or more, and is preferably 10 mass % or less, and more preferably 5 mass % or less. When the proportion constituted by the nitrile group-containing monomer unit in the first organic particles is not less than 0.1 mass % and not more than 10 mass %, production of fine particles can be inhibited by ensuring polymerization stability in production of the first organic particles, and secondary battery cycle characteristics can be further improved.

—Acidic Group-Containing Monomer Unit—

Examples of acidic group-containing monomers that can form the acidic group-containing monomer unit include carboxy group-containing monomers, sulfo group-containing monomers, and phosphate group-containing monomers.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxy group through hydrolysis can be used as a carboxy group-containing monomer.

Examples of sulfo group-containing monomers include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of these acidic group-containing monomers may be used individually, or two or more of these acidic group-containing monomers may be used in combination. Of these acidic group-containing monomers, carboxy group-containing monomers are preferable, and acrylic acid is more preferable.

The fractional content of the acidic group-containing monomer unit in the first organic particles when all repeating units of the polymer forming the first organic particles are taken to be 100 mass % is preferably 0.2 mass % or more, and more preferably 1 mass % or more, and is preferably 20 mass % or less, and more preferably 10 mass % or less. When the proportion constituted by the acidic group-containing monomer unit in the first organic particles is 0.2 mass % or more, production of fine particles can be inhibited by ensuring polymerization stability in production of the organic particles, and secondary battery cycle characteristics can be further improved. On the other hand, when the proportion constituted by the acidic group-containing monomer unit in the first organic particles is 20 mass % or less, the amount of water that is imported into a secondary battery can be reduced, and secondary battery cycle characteristics can be further improved.

<<Production Method>>

The first organic particles can be produced through polymerization of a monomer composition containing the monomers described above, carried out in an aqueous solvent such as water, for example. In the polymerization, the fractional content of each monomer in the monomer composition can be set in accordance with the fractional content of each repeating unit (monomer unit) in the organic particles.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction. In the polymerization, seed particles may be used to perform seeded polymerization. The polymerization conditions can be adjusted as appropriate depending on the polymerization method and so forth.

Known additives such as emulsifiers, polymerization initiators, and chain transfer agents can be used in the polymerization and the amount thereof may be the same as typically used.

<<Volume-Average Particle Diameter $D_1$>>

The volume-average particle diameter $D_1$ of the first organic particles obtained as described above is preferably 50 nm or more, more preferably 100 nm or more, and even more preferably 150 nm or more, and is preferably 370 nm or less, more preferably 350 nm or less, and even more preferably 300 nm or less. When the volume-average particle diameter $D_1$ is 50 nm or more, functional layer resistance does not excessively increase, and adequate secondary battery cycle characteristics can be ensured. On the other hand, when the volume-average particle diameter $D_1$ is 370 nm or less, it is possible to increase coating density when the composition for a functional layer is applied onto a substrate to form a functional layer and to further improve heat shrinkage resistance of the obtained functional layer after immersion in electrolyte solution.

Note that the volume-average particle diameter of the first organic particles can be adjusted by altering the type and amount of a polymerization initiator, chain transfer agent, and/or emulsifier used in production of the first organic particles, for example. In a case in which the first organic particles are produced by seeded polymerization, for example, the seed particles can be reduced in size and the volume-average particle diameter of the obtained first organic particles can be reduced by increasing the amount of emulsifier used in production of the seed particles, whereas the seed particles can be increased in size and the volume-average particle diameter of the obtained first organic particles can be increased by reducing the amount of emulsifier used in production of the seed particles.

The volume-average particle diameter $D_1$ of the first organic particles is preferably smaller than the volume-average particle diameter $D_2$ of the subsequently described second organic particles. When the volume-average particle diameter $D_1$ of the first organic particles is smaller than the volume-average particle diameter $D_2$ of the second organic particles, heat shrinkage resistance and adhesiveness of a functional layer after immersion in electrolyte solution can be further improved.

<<Glass-Transition Temperature>>

The glass-transition temperature of the first organic particles obtained as described above is preferably 150° C. or higher, more preferably 170° C. or higher, and even more preferably 180° C. or higher. When the glass-transition temperature of the first organic particles is 150° C. or higher, heat shrinkage resistance of a functional layer can be further improved. Although no specific limitations are placed on the upper limit of the glass-transition temperature of the first organic particles, the glass-transition temperature of the first organic particles is normally 500° C. or lower.

The "glass-transition temperature" of the first organic particles referred to in the present disclosure can be measured by a method described in the EXAMPLES section of the present specification.

Note that the glass-transition temperature of the first organic particles can be adjusted by altering the types and proportions of monomers used in production of the first organic particles, for example.

<Second Organic Particles>

The second organic particles are particles that are formed by a polymer and are a component that can mainly improve heat shrinkage resistance, adhesiveness, and so forth of a functional layer after immersion in electrolyte solution.

The second organic particles include a nitrile group-containing monomer unit in a proportion of not less than 20 mass % and not more than 80 mass % and a cross-linkable monomer unit in a proportion of not less than 0.1 mass % and not more than 10 mass % as previously described, and also include repeating units other than the cross-linkable monomer unit and the nitrile group-containing monomer unit (other repeating units) in a proportion of not less than 10 mass % and not more than 79.9 mass %. The fractional content of the nitrile group-containing monomer unit in the second organic particles is preferably 21 mass % or more, and more preferably 30 mass % or more, and is preferably 40.6 mass % or less. Moreover, the fractional content of the cross-linkable monomer unit in the second organic particles is preferably 0.7 mass % or more, and is preferably 3 mass % or less.

If the proportion constituted by the nitrile group-containing monomer unit in the second organic particles is less than 20 mass %, the second organic particles swell excessively in electrolyte solution, and heat shrinkage resistance and adhesiveness of a functional layer after immersion in electrolyte solution are lost. On the other hand, if the proportion constituted by the nitrile group-containing monomer unit in the second organic particles is more than 80 mass %, deformability of the second organic particles during pressing decreases due to a rise in the glass-transition temperature of the second organic particles, and heat shrinkage resistance and adhesiveness of a functional layer after immersion in electrolyte solution are lost.

Moreover, if the proportion constituted by the cross-linkable monomer unit in the second organic particles is less than 0.1 mass %, the second organic particles swell excessively in electrolyte solution, and secondary battery cycle characteristics are lost. On the other hand, if the proportion constituted by the cross-linkable monomer unit in the second organic particles is more than 10 mass %, deformability of the second organic particles during pressing decreases due to increased strength of the second organic particles, and heat shrinkage resistance and adhesiveness of a functional layer after immersion in electrolyte solution are lost.

No specific limitations are placed on the structure of the second organic particles so long as the second organic particles have a particulate form. However, it is preferable that the second organic particles have a core-shell structure including a core portion and a shell portion that at least partially covers the outer surface of the core portion. By using second organic particles having a core-shell structure, excessive swelling of the second organic particles in electrolyte solution is inhibited, heat shrinkage resistance and adhesiveness of a functional layer after immersion in electrolyte solution can be further improved, and cycle characteristics of a secondary battery can be further enhanced.

Although the following provides a detailed description of a case in which the second organic particles have a core-shell structure, this is not intended to be a limitation on the present disclosure.

<<Core-Shell Structure>>

In the case of second organic particles having a core-shell structure, the second organic particles have a core-shell structure including a core portion and a shell portion covering the outer surface of the core portion. Although the shell portion may entirely cover or partially cover the outer surface of the core portion, it is preferable that the shell portion partially covers the outer surface of the core portion from a viewpoint of further increasing heat shrinkage resistance and adhesiveness of a functional layer after immersion in electrolyte solution and further enhancing cycle characteristics of a secondary battery. In other words, the shell portion of the second organic particles preferably covers the outer surface of the core portion without covering the entire outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Accordingly, a second organic particle including a shell portion having fine pores that pass from the outer surface of the shell portion (i.e., the circumferential surface of the second organic particle) to the outer surface of the core portion is also considered to be included among the preferable second organic particles described above in which a shell portion partially covers the outer surface of a core portion.

More specifically, FIG. 1 illustrates the cross-sectional structure of one example of a preferable second organic particle. A second organic particle 100 illustrated in FIG. 1 has a core-shell structure including a core portion 110 and a shell portion 120. The core portion 110 is a portion of the second organic particle 100 that is located further inward than the shell portion 120. The shell portion 120 is a portion that covers an outer surface 110S of the core portion 110 and is normally an outermost portion of the second organic particle 100. In this example, the shell portion 120 partially covers the outer surface 110S of the core portion 110 and does not cover the entire outer surface 110S of the core portion 110.

Note that the second organic particles having a core-shell structure may optionally include constituent elements other than the core portion and the shell portion described above, so long as the expected effects are not significantly lost. Specifically, the second organic particles may, for example, include a portion inside of the core portion that is formed from a different polymer to the core portion. In one specific example, a residual seed particle may be present inside of the core portion in a situation in which seed particles are used in production of the second organic particles by seeded polymerization. However, from a viewpoint of more clearly displaying the expected effects, it is preferable that the second organic particles are composed by only the core portion and the shell portion.

[Core Portion]

In a case in which the second organic particles have a core-shell structure, it is preferable that a nitrile group-containing monomer unit and a cross-linkable monomer unit are included in at least a polymer forming the core portion (core polymer). The core polymer preferably includes a monofunctional (meth)acrylic acid ester monomer unit and an acidic group-containing monomer unit as other repeating units in addition to the nitrile group-containing monomer unit and the cross-linkable monomer unit.

—Nitrile Group-Containing Monomer Unit—

Examples of nitrile group-containing monomers that can form the nitrile group-containing monomer unit include the same nitrile group-containing monomers as previously described in the "First organic particles" section. One of these nitrile group-containing monomers may be used individually, or two or more of these nitrile group-containing monomers may be used in combination. Of these nitrile group-containing monomers, acrylonitrile and methacrylonitrile are preferable.

The fractional content of the nitrile group-containing monomer unit in the core polymer of the second organic particles when all repeating units of the polymer forming the second organic particles are taken to be 100 mass % is preferably 20 mass % or more, more preferably 21 mass % or more, even more preferably 23 mass % or more, further preferably 25 mass % or more, and particularly preferably 30 mass % or more, and is preferably 80 mass % or less, more preferably 45 mass % or less, even more preferably 40.6 mass % or less, and particularly preferably 35 mass % or less. When the proportion in which the nitrile group-containing monomer unit is included in the core polymer is 20 mass % or more relative to 100 mass % of all repeating units of the second organic particles, excessive swelling of the second organic particles in electrolyte solution can be inhibited, and heat shrinkage resistance and adhesiveness of a functional layer after immersion in electrolyte solution can be sufficiently improved. On the other hand, when the proportion in which the nitrile group-containing monomer unit is included in the core polymer is 80 mass % or less relative to 100 mass % of all repeating units of the second organic particles, polymer flexibility of the second organic particles in electrolyte solution can be maintained, and heat shrinkage resistance and adhesiveness of a functional layer after immersion in electrolyte solution can be sufficiently improved.

—Cross-Linkable Monomer Unit—

Examples of cross-linkable monomers that can form the cross-linkable monomer unit include, without any specific limitations, monomers that can form a cross-linked structure through polymerization. Typical examples of cross-linkable monomers include monomers that are thermally cross-linkable. Specific examples include monofunctional monomers that include a thermally cross-linkable group and one ethylenically unsaturated bond per molecule; and polyfunctional ethylenically unsaturated monomers (monomers that include two or more ethylenically unsaturated bonds per molecule).

Examples of thermally cross-linkable groups include an epoxy group, an N-methylol amide group, an oxetanyl group, an oxazoline group, and combinations thereof. Of these thermally cross-linkable groups, an epoxy group is more preferable in terms of ease of cross-linking and cross-link density adjustment.

Examples of monomers including an epoxy group as a thermally cross-linkable group and including an ethylenically unsaturated bond include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of monomers including an N-methylol amide group as a thermally cross-linkable group and including an ethylenically unsaturated bond include (meth)acrylamides that include a methylol group such as N-methylol (meth)acrylamide.

Examples of monomers including an oxetanyl group as a thermally cross-linkable group and including an ethylenically unsaturated bond include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Examples of monomers including an oxazoline group as a thermally cross-linkable group and including an ethylenically unsaturated bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of polyfunctional ethylenically unsaturated monomers (monomers that include two or more ethylenically unsaturated bonds per molecule) include the same "polyfunctional ethylenically unsaturated monomers" as previously described in the "First organic particles" section.

One of these cross-linkable monomers may be used individually, or two or more of these cross-linkable monomers may be used in combination. Of these cross-linkable monomers, ethylene glycol dimethacrylate is preferable.

The fractional content of the cross-linkable monomer unit in the core polymer of the second organic particles when all repeating units of the polymer forming the second organic particles are taken to be 100 mass % is preferably 0.1 mass % or more, more preferably 0.3 mass % or more, and even more preferably 0.7 mass % or more, and is preferably 10 mass % or less, more preferably 5 mass % or less, even more preferably 3 mass % or less, and particularly preferably 2 mass % or less. When the proportion in which the cross-linkable monomer unit is included in the core polymer is 0.1 mass % or more relative to 100 mass % of all repeating units of the second organic particles, excessive swelling of the second organic particles in electrolyte solution can be inhibited, and secondary battery cycle characteristics can be sufficiently improved. On the other hand, when the proportion in which the cross-linkable monomer unit is included in the core polymer is 10 mass % or less relative to 100 mass % of all repeating units of the second organic particles, polymer flexibility of the second organic particles in electrolyte solution can be maintained, and heat shrinkage resistance and adhesiveness of a functional layer can be sufficiently improved.

—Monofunctional (Meth)Acrylic Acid Ester Monomer Unit—

Examples of monofunctional (meth)acrylic acid ester monomers that can form the monofunctional (meth)acrylic acid ester monomer unit include the same monofunctional (meth)acrylic acid ester monomers as previously described in the "First organic particles" section. One of these monofunctional (meth)acrylic acid ester monomers may be used individually, or two or more of these monofunctional (meth)acrylic acid ester monomers may be used in combination. Of these monofunctional (meth)acrylic acid ester monomers, methyl acrylate, ethyl acrylate, n-butyl acrylate, 2-ethylhexyl acrylate, methyl methacrylate, ethyl methacrylate, n-butyl methacrylate, and 2-ethylhexyl methacrylate are preferable, and n-butyl acrylate and methyl methacrylate are more preferable.

The fractional content of the monofunctional (meth)acrylic acid ester monomer unit in the core polymer of the second organic particles when all repeating units of the polymer forming the second organic particles are taken to be 100 mass % is preferably 5 mass % or more, more preferably 15 mass % or more, and even more preferably 30 mass % or more, and is preferably 50 mass % or less, more preferably 45 mass % or less, and even more preferably 40 mass % or less. When the proportion in which the monofunctional (meth)acrylic acid ester monomer unit is included in the core polymer is 5 mass % or more relative to 100 mass % of all repeating units of the second organic particles, deformability of the second organic particles can be ensured by inhibiting an excessive rise of the glass-transition temperature of the second organic particles (glass-transition temperature of the core polymer of the second organic particles), and adhesiveness of a functional layer after immersion in electrolyte solution can be further improved. On the other hand, when the proportion in which the monofunctional (meth)acrylic acid ester monomer unit is included in the core polymer is 50 mass % or less relative to 100 mass % of all repeating units of the second organic particles, blocking of a battery component including a functional layer can be inhibited, excessive swelling of the second organic particles in electrolyte solution can be inhibited, and functional layer adhesiveness after immersion in electrolyte solution and secondary battery cycle characteristics can be further improved.

—Acidic Group-Containing Monomer Unit—

Examples of acidic group-containing monomers that can form the acidic group-containing monomer unit include the same acidic group-containing monomers as previously described in the "First organic particles" section. One of these acidic group-containing monomers may be used individually, or two or more of these acidic group-containing monomers may be used in combination. Of these acidic group-containing monomers, carboxy group-containing monomers are preferable, and methacrylic acid is more preferable.

The fractional content of the acidic group-containing monomer unit in the core polymer of the second organic particles when all repeating units of the polymer forming the second organic particles are taken to be 100 mass % is preferably not less than 0.1 mass % and not more than 3 mass %. When the proportion in which the acidic group-containing monomer unit is included in the core polymer is 0.1 mass % or more relative to 100 mass % of all repeating units of the second organic particles, formation of aggregates can be inhibited by ensuring polymer stability in production of the core polymer, and secondary battery cycle characteristics can be further improved. On the other hand, when the proportion in which the acidic group-containing monomer unit is included in the core polymer is 3 mass % or less relative to 100 mass % of all repeating units of the second organic particles, the amount of water that is imported into a secondary battery can be reduced, and secondary battery cycle characteristics can be enhanced.

[Shell Portion]

In a case in which the second organic particles have a core-shell structure, the polymer forming the shell portion (shell polymer) preferably includes an aromatic monovinyl monomer unit. Note that besides the aromatic monovinyl monomer unit, the shell polymer may include a nitrile group-containing monomer unit, a cross-linkable monomer unit, a monofunctional (meth)acrylic acid ester monomer unit, an acidic group-containing monomer unit, or the like, such as previously described in the "Core portion" section.

—Aromatic Monovinyl Monomer Unit—

Examples of aromatic monovinyl monomers that can form the aromatic monovinyl monomer unit include styrene, styrene sulfonic acid and salts thereof (for example, sodium styrenesulfonate), α-methylstyrene, vinyltoluene, and 4-(tert-butoxy)styrene. One of these aromatic monovinyl monomers may be used individually, or two or more of these aromatic monovinyl monomers may be used in combination. Of these aromatic monovinyl monomers, styrene is preferable.

The fractional content of the aromatic monovinyl monomer unit in the shell polymer of the second organic particles when all repeating units of the polymer forming the second organic particles are taken to be 100 mass % is preferably 10 mass % or more, and more preferably 20 mass % or more, and is preferably 40 mass % or less, and more preferably 35 mass % or less. When the proportion in which the aromatic monovinyl monomer unit is included in the shell polymer is 10 mass % or more relative to 100 mass % of all repeating units of the second organic particles, blocking of a battery component including a functional layer can be inhibited, excessive swelling of the second organic particles in electrolyte solution can be inhibited, and functional layer adhesiveness after immersion in electrolyte solution and secondary battery cycle characteristics can be further improved. On the other hand, when the proportion in which the aromatic monovinyl monomer unit is included in the shell polymer is 40 mass % or less relative to 100 mass % of all repeating units of the second organic particles, deformability of the second organic particles during pressing can be ensured by inhibiting an excessive rise in the glass-transition temperature of the second organic particles (glass-transition temperature of the shell polymer of the second organic particles), and heat shrinkage resistance and adhesiveness of a functional layer after immersion in electrolyte solution can be further improved.

<<Production Method>>

No specific limitations are placed on the method by which the second organic particles are produced. For example, second organic particles having the core-shell structure described above can be produced by stepwise polymerization in which monomer for the core polymer and monomer for the shell polymer are used, and in which the ratio of these monomers is changed over time. Specifically, the second organic particles can be produced by continuous, multistep emulsion polymerization or multistep suspension polymerization in which a polymer of a preceding step is covered by a polymer of a subsequent step.

The following describes one example of a case in which second organic particles having the core-shell structure described above are obtained by multistep emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Examples of polymerization initiators that can be used include peroxides such as t-butyl peroxy-2-ethylhexanoate, potassium persulfate, and cumene peroxide, and azo compounds such as 2,2'-azobis(2-methyl-N-(2-hydroxyethyl)propionamide) and 2,2'-azobis(2-amidinopropane) hydrochloride.

The polymerization procedure involves initially mixing monomer for forming the core portion and the emulsifier, and performing emulsion polymerization as one batch to obtain a particulate polymer that forms the core portion. The second organic particles having the core-shell structure described above can then be obtained by performing polymerization of monomer for forming the shell portion in the presence of the particulate polymer forming the core portion.

In this polymerization, it is preferable that monomer for forming the shell polymer is supplied into the polymerization system continuously or divided into a plurality of portions from a viewpoint of partially covering the outer surface of the core portion with the shell portion. As a result of monomer for forming the shell polymer being supplied into the polymerization system in portions or continuously, the polymer forming the shell portion can be formed as particles that bond to the core portion such as to form a shell portion that partially covers the core portion.

It tends to be easier to form a shell portion that partially covers the core portion when a monomer having low affinity with the polymerization solvent is used as a monomer for forming the shell polymer. Thus, in a situation in which the polymerization solvent is water, monomer used to form the shell polymer preferably includes a hydrophobic monomer, and particularly preferably includes an aromatic monovinyl monomer such as previously described.

Moreover, it tends to be easier to form a shell portion that partially covers the core portion when a smaller amount of emulsifier is used in polymerization of the shell portion. Accordingly, appropriate adjustment of the amount of emulsifier that is used can also enable formation of a shell portion that partially covers the core portion.

Note that the volume-average particle diameter of the second organic particles after formation of the shell portion can be set within a desired range by adjusting the amount of emulsifier and the amounts of monomers, for example.

<<Volume-Average Particle Diameter $D_2$>>

The volume-average particle diameter $D_2$ of the second organic particles obtained as described above is preferably 400 nm or more, more preferably 450 nm or more, and even more preferably 470 nm or more, and is preferably 1,000 nm or less, more preferably 700 nm or less, and even more preferably 550 nm or less. When the volume-average particle diameter $D_2$ is 400 nm or more, void filling due to an increase in the number of second organic particles can be inhibited, and secondary battery cycle characteristics can be further improved. On the other hand, when the volume-average particle diameter $D_2$ is 1,000 nm or less, formation of a suitable functional layer is possible due to leveling properties of the composition for a functional layer being ensured, and secondary battery cycle characteristics can be further improved.

<<Glass-Transition Temperature>>

The glass-transition temperature of the second organic particles obtained as described above (each glass-transition temperature in the case of second organic particles having more than one glass-transition temperature) is preferably 10° C. or higher, more preferably 15° C. or higher, and even more preferably 20° C. or higher, and is preferably 150° C. or lower, and more preferably 130° C. or lower. When the glass-transition temperature of the second organic particles is 10° C. or higher, adhesiveness of a functional layer can be further improved. On the other hand, when the glass-transition temperature of the second organic particles is 150° C. or lower, heat shrinkage resistance of a functional layer can be further improved.

The "glass-transition temperature" of the second organic particles referred to in the present disclosure can be measured by a method described in the EXAMPLES section of the present specification.

Note that the glass-transition temperature of the second organic particles can be adjusted by altering the types and proportions of monomers used in production of the second organic particles, for example.

<<Content Ratio of First Organic Particles and Second Organic Particles>>

Although no specific limitations are placed on the content ratio of the first organic particles and the second organic particles in the composition for a functional layer, the proportion constituted by the first organic particles among the total of the first organic particles and the second organic particles is preferably 5 mass % or more, more preferably 30 mass % or more, and even more preferably 40 mass % or more, and is preferably 95 mass % or less, more preferably 80 mass % or less, and even more preferably 70 mass % or less. When the proportion constituted by the first organic particles among the total of the first organic particles and the second organic particles is 5 mass % or more, heat shrinkage resistance of a functional layer after immersion in electrolyte solution and cycle characteristics of a secondary battery can be further improved. On the other hand, when the proportion constituted by the first organic particles among the total of the first organic particles and the second organic particles is 95 mass % or less, adhesiveness of a functional layer after immersion in electrolyte solution can be further improved.

<Binder>

The presently disclosed composition for a functional layer preferably contains a binder. The binder is a component that is formed by a polymer and that, in a functional layer formed using the composition for a functional layer, can hold components contained in the functional layer, such as the organic particles, so that these components do not become detached from the functional layer.

<<Chemical Composition>>

The binder is preferably formed by a polymer that includes a cross-linkable monomer unit in a proportion of not less than 0.05 mass % and not more than 5 mass %, and that also includes repeating units other than the cross-linkable monomer unit (other repeating units), but is not specifically limited thereto.

[Cross-Linkable Monomer Unit]

Examples of cross-linkable monomers that can form the cross-linkable monomer unit include the same cross-linkable monomers as previously described in the "Second organic particles" section. One of these cross-linkable monomers may be used individually, or two or more of these cross-linkable monomers may be used in combination. Of these cross-linkable monomers, allyl methacrylate and allyl glycidyl ether are preferable.

The fractional content of the cross-linkable monomer unit in the binder when all repeating units of the polymer forming the binder are taken to be 100 mass % is preferably 0.05 mass % or more, and more preferably 0.1 mass % or more, and is preferably 5 mass % or less, more preferably 3.5 mass % or less, and even more preferably 2.5 mass % or less. When the proportion constituted by the cross-linkable monomer unit in the binder is 0.05 mass % or more, excessive swelling of the binder in electrolyte solution can be inhibited by ensuring the degree of cross-linking of the binder, and secondary battery cycle characteristics can be further improved. On the other hand, when the proportion constituted by the cross-linkable monomer unit in the binder is 5 mass % or less, adhesiveness of a functional layer after immersion in electrolyte solution can be improved by ensuring binding capacity of the binder, and heat shrinkage resistance of the functional layer after immersion in electrolyte solution can be further increased.

[Other Repeating Units]

Examples of the other repeating units included in the polymer forming the binder include, but are not specifically limited to, a monofunctional (meth)acrylic acid ester monomer unit, an aromatic monovinyl monomer unit, and an acidic group-containing monomer unit.

—Monofunctional (Meth)Acrylic Acid Ester Monomer Unit—

Examples of monofunctional (meth)acrylic acid ester monomers that can form the monofunctional (meth)acrylic acid ester monomer unit include the same monofunctional (meth)acrylic acid ester monomers as previously described in the "First organic particles" section. One of these monofunctional (meth)acrylic acid ester monomers may be used individually, or two or more of these monofunctional (meth)acrylic acid ester monomers may be used in combination. Of these monofunctional (meth)acrylic acid ester monomers, methyl acrylate, ethyl acrylate, n-butyl acrylate, 2-ethylhexyl acrylate, methyl methacrylate, ethyl methacrylate, n-butyl methacrylate, and 2-ethylhexyl methacrylate are preferable, and 2-ethylhexyl acrylate is more preferable.

The fractional content of the monofunctional (meth)acrylic acid ester monomer unit in the binder when all repeating units of the polymer forming the binder are taken to be 100 mass % is preferably 60 mass % or more, and more preferably 65 mass % or more, and is preferably 80 mass % or less, and more preferably 75 mass % or less. When the proportion constituted by the monofunctional (meth)acrylic acid ester monomer unit in the binder is 60 mass % or more, an excessive rise in the glass-transition temperature of the binder can be inhibited, and sufficient functional layer adhesiveness after immersion in electrolyte solution can be ensured. On the other hand, when the proportion constituted by the monofunctional (meth)acrylic acid ester monomer unit in the binder is 80 mass % or less, secondary battery cycle characteristics can be further improved.

—Aromatic Monovinyl Monomer Unit—

Examples of aromatic monovinyl monomers that can form the aromatic monovinyl monomer unit include the same aromatic monovinyl monomers as previously described in the "Second organic particles" section. One of these aromatic monovinyl monomers may be used individually, or two or more of these aromatic monovinyl monomers may be used in combination. Of these aromatic monovinyl monomers, styrene is preferable.

The fractional content of the aromatic monovinyl monomer unit in the binder when all repeating units of the polymer forming the binder are taken to be 100 mass % is preferably 10 mass % or more, and more preferably 20 mass % or more, and is preferably 40 mass % or less, and more preferably 30 mass % or less. When the proportion constituted by the aromatic monovinyl monomer unit in the binder is 10 mass % or more, secondary battery cycle characteristics can be further improved. On the other hand, when the proportion constituted by the aromatic monovinyl monomer unit in the binder is 40 mass % or less, the glass-transition temperature of the binder does not excessively rise, and sufficient functional layer adhesiveness after immersion in electrolyte solution can be ensured.

—Acidic Group-Containing Monomer Unit—

Examples of acidic group-containing monomers that can form the acidic group-containing monomer unit include the same acidic group-containing monomers as previously described in the "First organic particles" section. One of these acidic group-containing monomers may be used individually, or two or more of these acidic group-containing monomers may be used in combination. Of these acidic group-containing monomers, carboxy group-containing monomers are preferable, and acrylic acid is more preferable.

The fractional content of the acidic group-containing monomer unit in the binder when all repeating units of the polymer forming the binder are taken to be 100 mass % is preferably 2 mass % or more, and more preferably 2.5 mass % or more, and is preferably 8 mass % or less, and more preferably 5 mass % or less. When the proportion constituted by the acidic group-containing monomer unit in the binder is 2 mass % or more, the formation of aggregates can be inhibited because polymer stability is ensured in production of the binder, and secondary battery cycle characteristics can be improved. On the other hand, when the proportion constituted by the acidic group-containing monomer unit in the binder is 8 mass % or less, the amount of water that is imported into a secondary battery can be reduced, and secondary battery cycle characteristics can be enhanced.

<<Production Method>>

The binder can be produced through polymerization of a monomer composition containing the monomers described above, carried out in an aqueous solvent such as water, for example. In the polymerization, the fractional content of each monomer in the monomer composition can be set in accordance with the fractional content of each repeating unit (monomer unit) in the binder.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction. The polymerization conditions can be adjusted as appropriate depending on the polymerization method and so forth.

Known additives such as emulsifiers, polymerization initiators, and chain transfer agents can be used in the polymerization and the amount thereof may be the same as typically used.

<<Glass-Transition Temperature>>

The glass-transition temperature of the binder obtained as described above is preferably −40° C. or higher, and is preferably 0° C. or lower, and more preferably −15° C. or lower. When the glass-transition temperature of the binder is −40° C. or higher, blocking of a battery component that includes a functional layer can be inhibited. On the other hand, when the glass-transition temperature of the binder is 0° C. or lower, sufficient functional layer adhesiveness after immersion in electrolyte solution can be ensured.

Note that the glass-transition temperature of the binder can be adjusted by altering the types and proportions of monomers used in production of the binder, for example. The glass-transition temperature of the binder can be raised by increasing the proportion in which an aromatic monovinyl monomer, such as styrene, is used in production of the binder, for example, and can be lowered by decreasing this proportion, for example.

<<Content Ratio of Organic Particles and Binder>>

Although no specific limitations are placed on the content ratio of the organic particles (total of the first organic particles and the second organic particles) and the binder in the composition for a functional layer, the proportion constituted by the binder among the total of the organic particles and the binder is preferably 1 mass % or more, and more preferably 2 mass % or more, and is preferably 15 mass % or less, and more preferably 12 mass % or less. When the proportion constituted by the binder among the total of the organic particles and the binder is 1 mass % or more, dusting of the organic particles can be inhibited, and sufficient heat shrinkage resistance of a functional layer after immersion in electrolyte solution can be ensured. On the other hand, when the proportion constituted by the binder among the total of the organic particles and the binder is 15 mass % or less, an excessive increase in functional layer resistance can be inhibited, and adequate secondary battery cycle characteristics can be ensured.

Note that the proportion constituted by the organic particles among all solid content in the composition for a functional layer is normally not less than 50 mass % and not more than 95 mass %.

<Solvent>

The solvent of the presently disclosed composition for a functional layer can be any known solvent in which the previously described first and second organic particles, and the binder that is used as necessary, can be dissolved or dispersed. Of such solvents, water is preferable as the solvent of the composition.

<Other Components>

No specific limitations are placed on components other than the first and second organic particles, binder, and solvent that can be contained in the presently disclosed composition for a functional layer. Examples of such components include known inorganic particles and known additives. Inorganic particles described in JP 2017-103034 A, for example, can be used as the known inorganic particles. Of these inorganic particles, alumina and boehmite are preferable. Moreover, components such as thickeners, surface tension modifiers, dispersants, viscosity modifiers, wetting agents, reinforcing materials, and additives for electrolyte solution can be used without any specific limitations as the known additives. These components are not specifically limited so long as they do not affect battery reactions and may be selected from commonly known components such as those described in WO 2012/115096 A1, for example. Moreover, one of these other components may be used individually, or two or more of these other components may be used in combination in a freely selected ratio.

<Production Method of Composition for Non-Aqueous Secondary Battery Functional Layer>

The presently disclosed composition for a functional layer can, without any specific limitations other than that the first and second organic particles described above and a solvent are included, be produced by stirring and mixing the first organic particles, the second organic particles, and the previously described binder and other components that may optionally be added, in the presence of a solvent such as water, for example. Note that in a case in which a dispersion liquid of the first organic particles, a dispersion liquid of the second organic particles, and/or a dispersion liquid of the binder is used in production of the composition for a functional layer, liquid content of the dispersion liquid may be used as the solvent of the composition for a functional layer.

The solid content concentration of the presently disclosed composition for a functional layer is normally not less than 10 mass % and not more than 40 mass %.

The method of stirring is not specifically limited and may be any known method. Specifically, the composition for a functional layer can be produced in slurry form by mixing the previously described components and the solvent using a typical stirring vessel, ball mill, sand mill, bead mill, pigment disperser, ultrasonic disperser, grinding machine, homogenizer, planetary mixer, FILMIX, or the like. Mixing of the components and solvent can normally be carried out in a temperature range of room temperature to 80° C. for a period of 10 minutes to several hours.

(Functional Layer for Non-Aqueous Secondary Battery)

The presently disclosed functional layer is a layer that is formed from the composition for a functional layer set forth above. The presently disclosed functional layer can be formed by, for example, applying the composition for a functional layer set forth above onto the surface of a suitable substrate to form a coating film, and then drying the coating film that is formed. In other words, the presently disclosed functional layer is formed by a dried product of the composition for a functional layer set forth above, contains the previously described first organic particles and second organic particles, and may optionally contain the previously described binder and other components. Note that the first organic particles, the second organic particles, and the binder may be cross-linked during drying of the composition for a functional layer or may be cross-linked during heat treatment or the like that is optionally performed after drying (i.e., the presently disclosed functional layer may contain a cross-linked product of the first organic particles, a cross-linked product of the second organic particles, and/or a cross-linked product of the binder, and may contain a cross-linked product obtained through cross-linking of two or more selected from the group consisting of the first organic particles, the second organic particles, and the binder). Each component contained in the functional layer is a component that was contained in the composition for a functional layer and the preferred ratio of each component is the same as the preferred ratio of the component in the composition for a functional layer.

As a result of the presently disclosed functional layer being formed using the composition for a functional layer set forth above, the presently disclosed functional layer has excellent heat shrinkage resistance and adhesiveness after immersion in electrolyte solution, and a secondary battery can be caused to display excellent cycle characteristics through use of a battery component that includes the functional layer.

<Substrate>

No limitations are placed on the substrate onto which the composition for a functional layer is applied. For example, a coating film of the composition for a functional layer may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a battery component of a secondary battery. Specifically, the functional layer that is peeled from the releasable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery component production efficiency since a step of peeling the functional layer can be omitted.

<<Separator Substrate>>

The separator substrate is not specifically limited and may be a known separator substrate such as an organic separator substrate. The organic separator substrate is a porous member that is made from an organic material. For example, the organic separator substrate may be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof. Although the separator substrate may be of any thickness, the thickness thereof is preferably not less than 5 μm and not more than 30 μm, more preferably not less than 5 μm and not more than 20 μm, and even more preferably not less than 5 μm and not more than 18 μm. A separator substrate thickness of 5 μm or more ensures adequate safety. Moreover, a separator substrate thickness of 30 μm or less can inhibit reduction of ion conductivity, inhibit deterioration of secondary battery output characteristics, inhibit increase of heat shrinkage force of the separator substrate, and increase heat resistance.

<<Electrode Substrate>>

The electrode substrate (positive/negative electrode substrate) is not specifically limited and may, for example, be an electrode substrate obtained by forming an electrode mixed material layer on a current collector.

Note that the current collector, the electrode active material (positive/negative electrode active material) and the binder for an electrode mixed material layer (binder for positive/negative electrode mixed material layer) in the electrode mixed material layer, and the method by which the electrode mixed material layer is formed on the current collector may be known examples thereof such as described in JP 2013-145763 A, for example.

<Formation Method of Functional Layer for Non-Aqueous Secondary Battery>

Examples of methods by which the functional layer may be formed on a substrate such as the separator substrate or electrode substrate described above include:

(1) a method in which the presently disclosed composition for a functional layer is applied onto the surface of a separator substrate or an electrode substrate (surface at the electrode mixed material layer side in the case of an electrode substrate; same applies below) and is then dried;

(2) a method in which a separator substrate or an electrode substrate is immersed in the presently disclosed composition for a functional layer and is then dried; and (3) a method in which the presently disclosed composition for a functional layer is applied onto a releasable substrate and is dried to produce a functional layer that is then transferred onto the surface of a separator substrate or an electrode substrate.

Of these methods, method (1) is particularly preferable since it allows simple control of the thickness of the functional layer. In more detail, method (1) includes a step of applying the composition for a functional layer onto a substrate (application step) and a step of drying the composition for a functional layer that has been applied onto the substrate to form a functional layer (functional layer formation step).

Note that the functional layer may be formed at one side or both sides of a separator substrate or an electrode substrate depending on the structure of the secondary battery that is to be produced. In a case in which a separator substrate is used as the substrate, the functional layer is preferably formed at both sides of the separator substrate, whereas in a case in which an electrode substrate is used as the substrate, the functional layer is preferably formed at one side of the electrode substrate, and particularly on the electrode mixed material layer.

<<Application Step>>

Examples of methods by which the composition for a functional layer can be applied onto the substrate in the application step include, but are not specifically limited to, doctor blading, reverse roll coating, direct roll coating, gravure coating, extrusion coating, and brush coating.

<<Functional Layer Formation Step>>

The method by which the composition for a functional layer on the substrate is dried in the functional layer formation step is not specifically limited and may be a commonly known method. Examples of drying methods that can be used include drying by warm, hot, or low-humidity air, drying in a vacuum, or drying through irradiation with infrared light, electron beams, or the like. Although no specific limitations are placed on the drying conditions, the drying temperature is preferably 40° C. to 150° C., and the drying time is preferably 2 minutes to 30 minutes.

<Thickness of Functional Layer>

The thickness of each functional layer formed on the substrate is preferably 0.5 μm or more, and is preferably 1.5 μm or less, more preferably 1.3 μm or less, and even more preferably 1.1 μm or less. When the thickness of the functional layer is 0.5 μm or more, sufficient heat shrinkage resistance of the functional layer after immersion in electrolyte solution can be ensured. On the other hand, when the thickness of the functional layer is 1.5 μm or less, an excessive increase in resistance of the functional layer can be inhibited, and adequate secondary battery cycle characteristics can be ensured.

<Battery Component Including Functional Layer>

A battery component (separator or electrode) including the presently disclosed functional layer may include constituent elements other than the presently disclosed functional layer set forth above in addition to the separator substrate or electrode substrate and the presently disclosed functional layer so long as the effects disclosed herein are not significantly lost.

(Non-Aqueous Secondary Battery)

The presently disclosed secondary battery includes the presently disclosed functional layer set forth above. More specifically, the presently disclosed secondary battery includes a positive electrode, a negative electrode, a separator, and an electrolyte solution, wherein the functional layer for a non-aqueous secondary battery set forth above is included by at least one battery component among the positive electrode, the negative electrode, and the separator.

<Positive Electrode, Negative Electrode, and Separator>

At least one of the positive electrode, the negative electrode, and the separator used in the presently disclosed secondary battery includes the presently disclosed functional layer. Specifically, an electrode obtained by forming an electrode mixed material layer on a current collector to obtain an electrode substrate and then providing the presently disclosed functional layer on the electrode substrate may be used as a positive electrode or negative electrode that includes the functional layer. Moreover, a separator obtained by providing the presently disclosed functional layer on a separator substrate may be used as a separator that includes the functional layer. The electrode substrate and the separator substrate can be any of the examples previously described in the "Functional layer for non-aqueous secondary battery" section.

Moreover, an electrode composed of an electrode substrate such as previously described or a separator composed of a separator substrate such as previously described may be used, without any specific limitations, as a positive electrode, negative electrode, or separator that does not include a functional layer.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed non-aqueous secondary battery set forth above can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. Note that at least one battery component among the positive electrode, the negative electrode, and the separator is a functional layer-equipped battery component. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative example, the volume-average particle diameter and glass-transition temperature of organic particles (first organic particles and second organic particles), the glass-transition temperature of a binder, the thickness and the heat shrinkage resistance and adhesiveness after electrolyte solution immersion of a functional layer, and the cycle characteristics of a secondary battery were evaluated by the following methods.

<Volume-Average Particle Diameter of Organic Particles>

A water dispersion of organic particles obtained in each example or comparative example was adjusted to a solid content concentration of 2% to prepare a water dispersion for measurement. The water dispersion for measurement was then used to measure a particle diameter distribution with a laser diffraction/light scattering particle size distribution analyzer (LS230 produced by Beckman Coulter Inc.). In the measured particle diameter distribution, the particle diameter at which cumulative volume calculated from a small-diameter end of the distribution reached 50% was taken to be the volume-average particle diameter (D50) of the organic particles.

<Glass-Transition Temperature (Tg) of Organic Particles and Binder>

Water dispersions of organic particles and water dispersions of binders obtained in the examples and comparative example were each dried to obtain a measurement sample.

A differential scanning calorimetry (DSC) curve was obtained by weighing 10 mg of the measurement sample into an aluminum pan and then using a differential scanning calorimeter (EXSTAR DSC6220 produced by SII Nano-Technology Inc.) to perform measurement under conditions prescribed by JIS Z 8703 with a measurement temperature range of −100° C. to 200° C. and a heating rate of 10° C./min. Note that an empty aluminum pan was used as a reference. In the heating process, the glass-transition temperature (° C.) was determined as a point of intersection of a baseline directly before a heat absorption peak on the DSC curve at which a derivative signal (DDSC) reached 0.05 mW/min/mg or more and a tangent to the DSC curve at a first inflection point to appear after the heat absorption peak.

<Functional Layer Thickness>

The thickness of a functional layer was calculated by subtracting the thickness of a substrate (separator substrate) without a functional layer formed thereon from the thickness of a battery component (separator) obtained by stacking the functional layer and the substrate. Note that the thicknesses of the battery component and the substrate were each determined by measuring the thickness thereof at 10 arbitrary points using a contact-type thickness meter (Digimatic Indicator Code No. 543-575 produced by Mitutoyo Corporation), and then calculating an average value of the measured thicknesses.

<Adhesiveness of Functional Layer after Immersion in Electrolyte Solution>

A single-layer polyethylene separator (thickness: 9 μm) produced by a wet method was prepared as a separator substrate. A composition for a functional layer obtained in each example or comparative example was applied onto one side of the separator substrate and was dried on the separator substrate at 50° C. for 10 minutes to form a functional layer (thickness: 1.0 μm). The separator including this functional layer was used as a separator for evaluation.

In addition, a negative electrode was produced in the same way as in Example 1 as a negative electrode for evaluation.

A rectangle of 10 mm×100 mm was cut out from each of the negative electrode for evaluation and the separator for evaluation that were obtained as described above. The negative electrode mixed material layer of the negative electrode was positioned along the functional layer surface of the separator and then 6 minutes of hot pressing was performed at a temperature of 85° C. and a pressure of 1.0 MPa to produce a laminate including the negative electrode and the separator. This laminate was used as a test specimen.

The test specimen was placed in laminate packing with approximately 400 μL of electrolyte solution. After 1 hour had passed, the test specimen was pressed, together with the laminate packing, at a temperature of 60° C. and a pressure of 1.0 MPa for 15 minutes. The test specimen was held at a temperature of 60° C. for 1 day after this pressing. Note that a solution obtained by dissolving $LiPF_6$ as a supporting electrolyte with a concentration of 1 mol/L in a mixed solvent of ethylene carbonate (EC), diethyl carbonate (DEC), and vinylene carbonate (VC) (EC/DEC/VC (volume mixing ratio at 25° C.)=68.5/30/1.5) was used as the electrolyte solution.

The test specimen was then removed, and electrolyte solution attached to the surface of the test specimen was wiped off. Next, the test specimen was positioned with the surface at the current collector side of the negative electrode facing downward, and cellophane tape was affixed to the surface at the current collector side of the negative electrode. Tape prescribed by JIS Z1522 was used as the cellophane tape. Moreover, the cellophane tape was secured to a horizontal test stage in advance. One end of the separator was pulled vertically upward at a pulling speed of 50 mm/min to peel off the separator, and the stress during peeling was measured. This measurement was performed three times. An average value of the stress was calculated as the peel strength and was evaluated by the following standard. A larger peel strength indicates better adhesiveness of the functional layer after immersion in electrolyte solution and stronger adhesion of the separator and the electrode (negative electrode) via the functional layer in electrolyte solution.

A: Peel strength of 1.5 N/m or more
B: Peel strength of not less than 1.0 N/m and less than 1.5 N/m
C: Peel strength of not less than 0.5 N/m and less than 1.0 N/m
D: Peel strength of less than 0.5 N/m <Heat Shrinkage Resistance of Functional Layer after Immersion in Electrolyte Solution>

A single-layer polyethylene separator (thickness: 9 μm) produced by a wet method was prepared as a separator substrate. A composition for a functional layer obtained in each example or comparative example was applied onto one side of the separator substrate and was dried on the separator substrate at 50° C. for 10 minutes to form a functional layer (thickness: 1.0 μm). The separator including this functional layer was used as a separator for evaluation.

In addition, a negative electrode was produced in the same way as in Example 1 as a negative electrode for evaluation.

A square of 10 cm×10 cm was cut out from the negative electrode for evaluation obtained as described above and a square of 12 cm×12 cm was cut out from the separator for evaluation obtained as described above.

The negative electrode mixed material layer of the negative electrode and the functional layer of the separator were arranged in contact with one another to obtain a test specimen. The test specimen was placed in laminate packing with approximately 800 μL of electrolyte solution. Note that a solution obtained by dissolving $LiPF_6$ as a supporting electrolyte with a concentration of 1 mol/L in a mixed solvent of ethylene carbonate (EC), diethyl carbonate (DEC), and vinylene carbonate (VC) (EC/DEC/VC (volume mixing ratio at 25° C.)=68.5/30/1.5) was used as the electrolyte solution.

Next, the aluminum packing case was closed by heat sealing at 150° C. in order to seal an opening of the aluminum packing case. After 12 hours, the test specimen sealed in the aluminum packing case was pressed, together with the aluminum packing case, at a temperature of 80° C. and a pressure of 1 MPa for 4 minutes.

The test specimen was then placed in a 130° C. thermostatic tank, together with the aluminum packing case, and was left for 1 hour. The test specimen was subsequently removed from the aluminum packing. The change in area of the separator including the functional layer (={(area of separator before being left−area of separator after being left)/area of separator before being left}×100%) was calculated as the rate of heat shrinkage, and was evaluated by the following standard. A smaller rate of heat shrinkage indicates that the functional layer formed using the composition for a functional layer has better heat shrinkage resistance.

A: Rate of heat shrinkage of less than 2%

B: Rate of heat shrinkage of not less than 2% and less than 5%

C: Rate of heat shrinkage of 5% or more

<Secondary Battery Cycle Characteristics>

A lithium ion secondary battery produced in each example or comparative example was left at rest at a temperature of 25° C. for 5 hours after electrolyte solution injection. Next, the lithium ion secondary battery was charged to a cell voltage of 3.65 V by a 0.2 C constant-current method at a temperature of 25° C., and was then subjected to aging at a temperature of 60° C. for 12 hours. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.30 V) and CC discharging of the lithium ion secondary battery was performed to 3.00 V by a 0.2 C constant-current method.

The lithium ion secondary battery was subsequently subjected to 100 cycles of an operation of charging and discharging between cell voltages of 4.30 V and 3.00 V at a charge/discharge rate of 1.0 C in an environment having a temperature of 25° C. The capacity $X1$ of the $1^{st}$ cycle (i.e., the initial discharge capacity) and the discharge capacity $X2$ of the $100^{th}$ cycle were measured. A capacity maintenance rate (%) (=(X2/X1)×100) was calculated and was evaluated by the following standard. A larger value for the capacity maintenance rate indicates that the secondary battery has better cycle characteristics.

A: Capacity maintenance rate of 80% or more

B: Capacity maintenance rate of not less than 70% and less than 80%

C: Capacity maintenance rate of not less than 60% and less than 70%

D: Capacity maintenance rate of less than 60%

Example 1

<Production of First Organic Particles>

A reactor A including a stirrer was charged with 0.20 parts of sodium dodecyl sulfate, 0.30 parts of ammonium persulfate, and 180 parts of deionized water. These materials were mixed to obtain a mixture and were heated to 65° C. Meanwhile, a monomer composition for seed particles was produced in a separate vessel by mixing 88.0 parts of n-butyl acrylate as a monofunctional (meth)acrylic acid ester monomer, 6.0 parts of acrylic acid as an acidic group-containing monomer, 6.0 parts of acrylonitrile as a nitrile group-containing monomer, 0.8 parts of sodium dodecyl sulfate, and 40 parts of deionized water.

The monomer composition for seed particles was continuously added into the reactor A over 4 hours to carry out a polymerization reaction. Note that a temperature of 65° C. was maintained inside the reactor during continuous addition of the monomer composition for seed particles. Once this continuous addition was completed, the polymerization reaction was continued at 80° C. for 3 hours. As a result, a water dispersion of seed particles was obtained. Note that the volume-average particle diameter of the seed particles, measured in the same way as for organic particles, was 120 nm.

Next, a reactor including a stirrer was charged with 16.7 parts in terms of solid content of the water dispersion of the seed particles (of which, n-butyl acrylate units constituted 14.7 parts, acrylic acid units constituted 1 part, and acrylonitrile units constituted 1 part), 80.8 parts of ethylene glycol dimethacrylate (produced by Kyoeisha Chemical Co., Ltd.; product name: LIGHT ESTER EG) as a polyfunctional ethylenically unsaturated monomer, 2.5 parts of acrylic acid as an acidic group-containing monomer, 0.8 parts of sodium dodecylbenzenesulfonate, 3.2 parts of t-butyl peroxy-2-ethylhexanoate (produced by NOF Corporation; product name: PERBUTYL O) as a polymerization initiator, and 160 parts of deionized water. These materials were stirred at 35° C. for 12 hours such that the polyfunctional ethylenically unsaturated monomer, the acidic group-containing monomer, and the polymerization initiator were completely absorbed by the seed particles. Thereafter, a temperature of 90° C. was maintained inside the reactor and a polymerization reaction (seeded polymerization) was carried out for 5 hours.

Next, steam was introduced into the reactor so as to remove unreacted monomer and initiator decomposition product, and thereby obtain a water dispersion of first organic particles. The volume-average particle diameter $D_1$ of the obtained first organic particles was measured. The result is shown in Table 1. Note that in measurement of the glass-transition temperature of the first organic particles, a peak was not observed in the measurement temperature range (−100° C. to 200° C.), and the glass-transition temperature of the first organic particles was confirmed to be higher than 200° C. (same applies for Examples 2 to 16).

<Production of Second Organic Particles>

A reactor including a stirrer was charged with 100 parts of deionized water and 0.5 parts of ammonium persulfate. The gas phase was purged with nitrogen gas and the temperature was raised to 60° C. Meanwhile, a monomer composition for core portion formation was obtained in a separate vessel by mixing 50 parts of deionized water, 0.3 parts of sodium dodecylbenzenesulfonate as an emulsifier, 24.6 parts of n-butyl acrylate and 14 parts of methyl methacrylate as monofunctional (meth)acrylic acid ester monomers, 30 parts of acrylonitrile as a nitrile group-containing monomer, 0.7 parts of methacrylic acid as an acidic group-containing monomer, and 0.7 parts of ethylene glycol dimethacrylate as a cross-linkable group-containing monomer. The monomer composition was continuously added to the reactor over 4 hours to carry out a polymerization reaction at 60° C. Polymerization was continued until a polymerization conversion rate of 96% was reached to yield a water dispersion containing a particulate polymer forming a core portion. Next, the water dispersion was heated to 80° C., 30 parts of styrene as an aromatic monovinyl monomer (for shell portion formation) was continuously added to the water dispersion over 30 minutes, and polymerization was continued. The reaction was terminated by cooling at the point at which the polymerization conversion rate reached 96% to produce a water dispersion containing second organic particles. The volume-average particle diameter $D_2$ of the obtained second organic particles was measured. The result is shown in Table 1. In measurement of the glass-transition temperature of the second organic particles, the glass-transition temperature of the core polymer was confirmed to be within a range of 30° C. to 90° C. and the glass-transition temperature of the shell polymer was confirmed to be within a range of 90° C. to 120° C. (same applies for Examples 2 to 16). Moreover, through observation of the cross-sectional structure of the second organic particles using a transmission electron microscope (TEM), the second organic particles were confirmed to have a core-shell structure in which a shell portion partially covered the outer surface of a core portion (same applies for Examples 2 to 16).

<Production of Binder>

A reactor B including a stirrer was charged with 70 parts of deionized water, 0.20 parts of polyoxyethylene lauryl ether (produced by Kao Corporation; product name: EMULGEN® 120 (EMULGEN is a registered trademark in Japan, other countries, or both)) as an emulsifier, and 0.5 parts of ammonium persulfate. The gas phase of the reactor B was purged with nitrogen gas and the temperature was raised to 60° C. Meanwhile, a monomer composition was obtained in a separate vessel by mixing 50 parts of deionized water, 0.5 parts of polyoxyethylene lauryl ether (produced by Kao Corporation; product name: EMULGEN® 120) as an emulsifier, 70 parts of 2-ethylhexyl acrylate as a monofunctional (meth)acrylic acid ester monomer, 25 parts of styrene as an aromatic monovinyl monomer, 1.7 parts of allyl glycidyl ether and 0.3 parts of allyl methacrylate as cross-linkable monomers, and 3 parts of acrylic acid as an acidic group-containing monomer.

The monomer composition was continuously added into the reactor B over 4 hours to carry out polymerization. The reaction was carried out at 70° C. during the continuous addition. Once this continuous addition was completed, further stirring was performed at 80° C. for 3 hours to complete the reaction and yield a water dispersion of a binder.

The obtained water dispersion of the binder was cooled to 25° C. and was then adjusted to pH 8.0 through addition of sodium hydroxide aqueous solution. Unreacted monomer was subsequently removed through introduction of steam. Thereafter, filtration was performed using a 200-mesh (opening size: approximately 77 µm) stainless steel screen while adjusting the solid content concentration with deionized water so as to obtain a water dispersion (solid content concentration: 40%) of the binder. Note that the volume-average particle diameter of the binder, measured in the same way as for organic particles, was 180 nm. The glass-transition temperature of the binder was −30° C.

<Production of Composition for Functional Layer>

A composition for a functional layer (solid content concentration: 20%) was obtained by mixing, in water, the water dispersion of the first organic particles obtained as described above, the water dispersion of the second organic particles obtained as described above, the water dispersion of the binder obtained as described above, carboxymethyl cellulose (produced by Daicel Corporation; product name: DAICEL 1220) as a thickener, and a wetting agent (produced by San Nopco Limited; product name: SN WET 980) such that first organic particles:second organic particles:binder:thickener:wetting agent (solid content mass ratio)=50:33.3:10: 5.7:1 (first organic particles:second organic particles=60:40; proportion constituted by binder among total of organic particles and binder: 10.7%). The obtained composition for a functional layer was used to produce a separator for evaluation and to evaluate heat shrinkage resistance and adhesiveness of a functional layer after immersion in electrolyte solution. The results are shown in Table 1.

<Production of Separator Including Functional Layer at Both Sides>

A single-layer polyethylene separator (thickness: 9 µm) produced by a wet method was prepared as a separator substrate. The composition for a functional layer obtained as described above was applied onto one side of the separator substrate and was dried on the separator substrate at 50° C. for 10 minutes to form a functional layer (thickness: 1.0 µm). The composition for a functional layer obtained as described above was also applied onto the other side of the separator substrate and was dried on the separator substrate at 50° C. for 10 minutes to form a functional layer (thickness: 1.0 µm) and thereby produce a separator including a functional layer at both sides.

<Production of Positive Electrode>

A slurry composition for a positive electrode was obtained by adding 3 parts (in terms of solid content) of polyvinylidene fluoride (PVDF; produced by Kureha Corporation; product name: KF-1100) as a binder for a positive electrode to 95 parts of $LiCoO_2$ as a positive electrode active material, further adding 2 parts of acetylene black as a conductive material and 20 parts of N-methylpyrrolidone as a solvent, and mixing these materials in a planetary mixer. The slurry composition for a positive electrode was applied onto one side of aluminum foil of 18 µm in thickness and was dried at 120° C. for 3 hours. Thereafter, rolling was performed by roll pressing to obtain a positive electrode (thickness: 100 µm) including a positive electrode mixed material layer.

<Production of Negative Electrode>

A slurry composition for a negative electrode was obtained by mixing 98 parts of graphite (particle diameter: 20 µm; specific surface area: 4.2 m$^2$/g) as a negative electrode active material and 1 part (in terms of solid content) of styrene-butadiene rubber (SBR; glass-transition temperature: −10° C.) as a binder for a negative electrode, adding 1.0 parts of carboxymethyl cellulose to the resultant mixture, and mixing these materials in a planetary mixer. The slurry composition for a negative electrode was applied onto one side of copper foil of 18 µm in thickness and was dried at 120° C. for 3 hours. Thereafter, rolling was performed by roll pressing to obtain a negative electrode (thickness: 100 µm) including a negative electrode mixed material layer.

<Production of Secondary Battery>

The positive electrode obtained as described above was cut out as 49 cm×5 cm and was placed on a stage with the surface at the positive electrode mixed material layer side thereof facing upward. The separator obtained as described above (separator including a functional layer at both sides) was cut out as 120 cm×5.5 cm and was arranged on the positive electrode mixed material layer of the positive electrode such that the positive electrode was positioned at a longitudinal direction left-hand side of the separator. In addition, the negative electrode obtained as described above was cut out as 50 cm×5.2 cm and was arranged on the separator such that the surface at the negative electrode mixed material layer side thereof was in contact with the separator and the negative electrode was positioned at a longitudinal direction right-hand side of the separator. In this manner, a laminate was obtained. The laminate was wound using a winding machine with the middle of the separator in the longitudinal direction at the center so as to obtain a roll. The roll was enclosed in an aluminum packing case serving as a battery case, and electrolyte solution (solvent: ethylene carbonate/ethyl methyl carbonate/vinylene carbonate (volume mixing ratio)=30.0/70.0/1.5; electrolyte: LiPF$_6$ of 1 M in concentration) was injected such that no air remained. The aluminum packing case was closed and sealed by heat sealing at 150° C. to produce a wound-type lithium ion secondary battery. Cycle characteristics of the obtained lithium ion secondary battery were evaluated. The result is shown in Table 1.

Example 2

First organic particles, second organic particles, a binder, a composition for a functional layer, a separator, a negative electrode, a positive electrode, and a secondary battery were produced in the same way as in Example 1 with the exception that in production of the first organic particles, seed particles were produced using a monomer composition for seed particles in which the amount of n-butyl acrylate was changed to 83.5 parts, the amount of acrylic acid was changed to 8.25 parts, and the amount of acrylonitrile was changed to 8.25 parts, and, in seeded polymerization, the amount of the seed particles in terms of solid content was changed to 12 parts (of which, n-butyl acrylate units constituted 10 parts, acrylic acid units constituted 1 part, and acrylonitrile units constituted 1 part), the amount of ethylene glycol dimethacrylate was changed to 86.5 parts, and the amount of acrylic acid was changed to 1.5 parts. Each evaluation was also performed in the same way as in Example 1. The results are shown in Table 1.

Example 3

First organic particles, second organic particles, a binder, a composition for a functional layer, a separator, a negative electrode, a positive electrode, and a secondary battery were produced in the same way as in Example 1 with the exception that in production of the first organic particles, seed particles were produced using a monomer composition for seed particles in which the amount of n-butyl acrylate was changed to 78.0 parts, the amount of acrylic acid was changed to 11.0 parts, and the amount of acrylonitrile was changed to 11.0 parts, and, in seeded polymerization, the amount of the seed particles in terms of solid content was changed to 44.5 parts (of which, n-butyl acrylate units constituted 34.7 parts, acrylic acid units constituted 4.9 parts, and acrylonitrile units constituted 4.9 parts), the amount of ethylene glycol dimethacrylate was changed to 54.4 parts, and the amount of acrylic acid was changed to 1.1 parts. Each evaluation was also performed in the same way as in Example 1. The results are shown in Table 1.

Example 4

First organic particles, second organic particles, a binder, a composition for a functional layer, a separator, a negative electrode, a positive electrode, and a secondary battery were produced in the same way as in Example 1 with the exception that divinylbenzene was used instead of ethylene glycol dimethacrylate in production of the first organic particles. Each evaluation was also performed in the same way as in Example 1. The results are shown in Table 1.

Examples 5 and 6

First organic particles, second organic particles, a binder, a composition for a functional layer, a separator, a negative electrode, a positive electrode, and a secondary battery were produced in the same way as in Example 1 with the exception that in production of the first organic particles, the amount of sodium dodecyl sulfate that was charged to the reactor A including a stirrer was changed from 0.20 parts to 0.10 parts (Example 5) or 0.40 parts (Example 6), and the volume-average particle diameter of the seed particles was adjusted to 250 nm (Example 5) or 70 nm (Example 6). Each evaluation was also performed in the same way as in Example 1. The results are shown in Table 1.

Examples 7 to 9

First organic particles, second organic particles, a binder, a composition for a functional layer, a separator, a negative electrode, a positive electrode, and a secondary battery were produced in the same way as in Example 1 with the exception that the chemical composition of the core portion was changed as shown in Table 1 in production of the second organic particles. Each evaluation was also performed in the same way as in Example 1. The results are shown in Table 1.

Examples 10 and 11

First organic particles, second organic particles, a binder, a composition for a functional layer, a separator, a negative electrode, a positive electrode, and a secondary battery were produced in the same way as in Example 1 with the exception that the amount of sodium dodecyl sulfate used in production of the second organic particles was changed from 0.3 parts to 0.35 parts (Example 10) or 0.23 parts (Example 11). Each evaluation was also performed in the same way as in Example 1. The results are shown in Table 2.

Example 12

First organic particles, second organic particles, a binder, a composition for a functional layer, a separator, a negative electrode, a positive electrode, and a secondary battery were produced in the same way as in Example 1 with the exception that the solid content mass ratio of components in production of the composition for a functional layer was changed to first organic particles:second organic particles:binder:thickener:wetting agent (solid content mass ratio) =25:58.3:10:5.7:1 (first organic particles:second organic particles (solid content mass ratio)=30:70). Each evaluation was also performed in the same way as in Example 1. The results are shown in Table 2.

Example 13

First organic particles, second organic particles, a binder, a composition for a functional layer, a separator, a negative electrode, a positive electrode, and a secondary battery were produced in the same way as in Example 1 with the exception that in production of the composition for a functional layer, first organic particles:second organic particles (solid content mass ratio) was changed to 70:30, and inorganic particles (boehmite; produced by Kawai Lime Industry Co., Ltd.: product name: Cerasur BMB; volume-average particle diameter: 300 nm) were also used in an amount equivalent to 20 volume % of the first organic particles. Each evaluation was also performed in the same way as in Example 1. The results are shown in Table 2.

Example 14

First organic particles, second organic particles, a binder, a composition for a functional layer, a separator, a negative electrode, a positive electrode, and a secondary battery were produced in the same way as in Example 1 with the exception that in production of the composition for a functional layer, first organic particles:second organic particles (solid content mass ratio) was changed to 70:30, and inorganic particles (alumina; produced by Sumitomo Chemical Co., Ltd.; product name: AKP-30; volume-average particle diameter: 270 nm) were also used in an amount equivalent to 20 volume % of the first organic particles. Each evaluation was also performed in the same way as in Example 1. The results are shown in Table 2.

Example 15

First organic particles, second organic particles, a binder, a composition for a functional layer, a separator, a negative electrode, a positive electrode, and a secondary battery were produced in the same way as in Example 1 with the exception that in production of the separator including a functional layer at both sides, the thickness of each functional layer was changed to 1.5 μm. Each evaluation was also performed in the same way as in Example 1. The results are shown in Table 2.

Example 16

First organic particles, second organic particles, a binder, a composition for a functional layer, a separator, a negative electrode, a positive electrode, and a secondary battery were produced in the same way as in Example 1 with the exception that the amount of sodium dodecyl sulfate used in production of the second organic particles was changed from 0.3 parts to 2.0 parts. Each evaluation was also performed in the same way as in Example 1. The results are shown in Table 2.

Comparative Example 1

First organic particles, second organic particles, a binder, a composition for a functional layer, a separator, a negative electrode, a positive electrode, and a secondary battery were produced in the same way as in Example 1 with the exception that in production of the first organic particles, seed particles were produced using a monomer composition for seed particles in which the amount of n-butyl acrylate was changed to 83.6 parts, the amount of acrylic acid was changed to 8.2 parts, and the amount of acrylonitrile was changed to 8.2 parts, and, in seeded polymerization, the amount of the seed particles in terms of solid content was changed to 6.1 parts (of which, n-butyl acrylate units constituted 5.1 parts, acrylic acid units constituted 0.5 parts, and acrylonitrile units constituted 0.5 parts), the amount of ethylene glycol dimethacrylate was changed to 92 parts, and the amount of acrylic acid was changed to 1.9 parts. Each evaluation was also performed in the same way as in Example 1. The results are shown in Table 2.

In Tables 1 and 2, shown below:
"EDMA" indicates ethylene glycol dimethacrylate unit;
"DVB" indicates divinylbenzene unit;
"AA" indicates acrylic acid unit;
"BA" indicates n-butyl acrylate unit;
"AN" indicates acrylonitrile unit;
"Partial" indicates core-shell structure in which a shell portion partially covers the outer surface of a core portion;
"MMA" indicates methyl methacrylate unit;
"MAA" indicates methacrylic acid unit;
"ST" indicates styrene unit;
"2EHA" indicates 2-ethylhexyl acrylate unit;
"AMA" indicates allyl methacrylate unit; and
"AGE" indicates allyl glycidyl ether unit.

TABLE 1

| | | | | | | Example 1 | Example 2 | Example 3 | Example 4 | Example 5 |
|---|---|---|---|---|---|---|---|---|---|---|
| Composition for functional layer | First organic particles | Chemical composition | Polyfunctional ethylenically unsaturated monomer unit | | Type | EDMA | EDMA | EDMA | DVB | EDMA |
| | | | | | Proportion [mass %] | 80.8 | 86.5 | 54.4 | 80.8 | 80.8 |
| | | | Acidic group-containing monomer unit | | Type | AA | AA | AA | AA | AA |
| | | | | | Proportion [mass %] | 2.5 | 1.5 | 1.1 | 2.5 | 2.5 |
| | | | Seed particles | Monofunctional (meth)acrylic acid ester monomer unit | Type | BA | BA | BA | BA | BA |
| | | | | | Proportion [mass %] | 14.7 | 10 | 34.7 | 14.7 | 14.7 |
| | | | | Nitrile group-containing monomer unit | Type | AN | AN | AN | AN | AN |
| | | | | | Proportion [mass %] | 1 | 1 | 4.9 | 1 | 1 |
| | | | | Acidic group-containing monomer unit | Type | AA | AA | AA | AA | AA |
| | | | | | Proportion [mass %] | 1 | 1 | 4.9 | 1 | 1 |
| | | Volume-average particle diameter $D_1$ [nm] | | | | 200 | 200 | 200 | 200 | 350 |
| | Second organic particles | Core-shell structure | | | | Partial | Partial | Partial | Partial | Partial |
| | | Chemical composition | Core | Nitrile group-containing monomer unit | Type | AN | AN | AN | AN | AN |
| | | | | | Proportion [mass %] | 30 | 30 | 30 | 30 | 30 |
| | | | | Monofunctional (meth)acrylic acid ester monomer unit | Type | BA | BA | BA | BA | BA |
| | | | | | Proportion [mass %] | 24.6 | 24.6 | 24.6 | 24.6 | 24.6 |
| | | | | | Type | MMA | MMA | MMA | MMA | MMA |
| | | | | | Proportion [mass %] | 14 | 14 | 14 | 14 | 14 |
| | | | | Acidic group-containing monomer unit | Type | MAA | MAA | MAA | MAA | MAA |
| | | | | | Proportion [mass %] | 0.7 | 0.7 | 0.7 | 0.7 | 0.7 |
| | | | | Cross-linkable monomer unit | Type | EDMA | EDMA | EDMA | EDMA | EDMA |
| | | | | | Proportion [mass %] | 0.7 | 0.7 | 0.7 | 0.7 | 0.7 |

TABLE 1-continued

| | | | | | | | | | |
|---|---|---|---|---|---|---|---|---|---|
| | | Shell | Aromatic monovinyl monomer unit | Type | ST | ST | ST | ST | ST |
| | | | | Proportion [mass %] | 30 | 30 | 30 | 30 | 30 |
| | | Volume-average particle diameter $D_2$ [nm] | | | 500 | 500 | 500 | 500 | 500 |
| Binder | Chemical composition | Monofunctional (meth)acrylic acid ester monomer unit | | Type | 2EHA | 2EHA | 2EHA | 2EHA | 2EHA |
| | | | | Proportion [mass %] | 70 | 70 | 70 | 70 | 70 |
| | | Aromatic monovinyl monomer unit | | Type | ST | ST | ST | ST | ST |
| | | | | Proportion [mass %] | 25 | 25 | 25 | 25 | 25 |
| | | Acidic group-containing monomer unit | | Type | AA | AA | AA | AA | AA |
| | | | | Proportion [mass %] | 3 | 3 | 3 | 3 | 3 |
| | | Cross-linkable monomer unit | | Type | AMA | AMA | AMA | AMA | AMA |
| | | | | Proportion [mass %] | 0.3 | 0.3 | 0.3 | 0.3 | 0.3 |
| | | | | Type | AGE | AGE | AGE | AGE | AGE |
| | | | | Proportion [mass %] | 1.7 | 1.7 | 1.7 | 1.7 | 1.7 |
| Inorganic particles | | | | | — | — | — | — | — |
| First organic particles:Second organic particles (mass ratio) | | | | | 60:40 | 60:40 | 60:40 | 60:40 | 60:40 |
| Relationship between $D_1$ and $D_2$ | | | | | $D_1 < D_2$ | $D_1 < D_2$ | $D_1 < D_2$ | $D_1 < D_2$ | $D_1 < D_2$ |
| Functional layer thickness [μm] | | | | | 1 | 1 | 1 | 1 | 1 |
| Heat shrinkage resistance after immersion in electrolyte solution | | | | | A | A | C | B | B |
| Adhesiveness after immersion in electrolyte solution | | | | | A | A | A | A | A |
| Cycle characteristics | | | | | A | B | B | A | A |

| | | | | | Example 6 | Example 7 | Example 8 | Example 9 |
|---|---|---|---|---|---|---|---|---|
| Composition for functional layer | First organic particles | Chemical composition | Polyfunctional ethylenically unsaturated monomer unit | Type | EDMA | EDMA | EDMA | EDMA |
| | | | | Proportion [mass %] | 80.8 | 80.8 | 80.8 | 80.8 |
| | | | Acidic group-containing monomer unit | Type | AA | AA | AA | AA |
| | | | | Proportion [mass %] | 2.5 | 2.5 | 2.5 | 2.5 |
| | | Seed particles | Monofunctional (meth)acrylic acid ester monomer unit | Type | BA | BA | BA | BA |
| | | | | Proportion [mass %] | 14.7 | 14.7 | 14.7 | 14.7 |
| | | | Nitrile group-containing monomer unit | Type | AN | AN | AN | AN |
| | | | | Proportion [mass %] | 1 | 1 | 1 | 1 |
| | | | Acidic group-containing monomer unit | Type | AA | AA | AA | AA |
| | | | | Proportion [mass %] | 1 | 1 | 1 | 1 |
| | Volume-average particle diameter $D_1$ [nm] | | | | 130 | 200 | 200 | 200 |
| Second organic particles | Core-shell structure | | | | Partial | Partial | Partial | Partial |
| | Chemical composition | Core | Nitrile group-containing monomer unit | Type | AN | AN | AN | AN |
| | | | | Proportion [mass %] | 30 | 40.6 | 21 | 30 |
| | | | Monofunctional (meth)acrylic acid ester monomer unit | Type | BA | BA | BA | BA |
| | | | | Proportion [mass %] | 24.6 | 21 | 26.6 | 24.6 |
| | | | | Type | MMA | MMA | MMA | MMA |
| | | | | Proportion [mass %] | 14 | 7 | 21 | 11.7 |
| | | | Acidic group-containing monomer unit | Type | MAA | MAA | MAA | MAA |
| | | | | Proportion [mass %] | 0.7 | 0.7 | 0.7 | 0.7 |
| | | | Cross-linkable monomer unit | Type | EDMA | EDMA | EDMA | EDMA |
| | | | | Proportion [mass %] | 0.7 | 0.7 | 0.7 | 3 |
| | | Shell | Aromatic monovinyl monomer unit | Type | ST | ST | ST | ST |
| | | | | Proportion [mass %] | 30 | 30 | 30 | 30 |
| | Volume-average particle diameter $D_2$ [nm] | | | | 500 | 500 | 500 | 500 |
| Binder | Chemical composition | Monofunctional (meth)acrylic acid ester monomer unit | | Type | 2EHA | 2EHA | 2EHA | 2EHA |
| | | | | Proportion [mass %] | 70 | 70 | 70 | 70 |
| | | Aromatic monovinyl monomer unit | | Type | ST | ST | ST | ST |
| | | | | Proportion [mass %] | 25 | 25 | 25 | 25 |
| | | Acidic group-containing monomer unit | | Type | AA | AA | AA | AA |
| | | | | Proportion [mass %] | 3 | 3 | 3 | 3 |
| | | Cross-linkable monomer unit | | Type | AMA | AMA | AMA | AMA |
| | | | | Proportion [mass %] | 0.3 | 0.3 | 0.3 | 0.3 |

TABLE 1-continued

|  |  |  | Type | AGE | AGE | AGE | AGE |
|---|---|---|---|---|---|---|---|
|  |  |  | Proportion [mass %] | 1.7 | 1.7 | 1.7 | 1.7 |
|  | Inorganic particles |  |  | — | — | — | — |
| First organic particles:Second organic particles (mass ratio) |  |  |  | 60:40 | 60:40 | 60:40 | 60:40 |
| Relationship between $D_1$ and $D_2$ |  |  |  | $D_1 < D_2$ | $D_1 < D_2$ | $D_1 < D_2$ | $D_1 < D_2$ |
| Functional layer thickness [μm] |  |  |  | 1 | 1 | 1 | 1 |
| Heat shrinkage resistance after immersion in electrolyte solution |  |  |  | A | B | B | B |
| Adhesiveness after immersion in electrolyte solution |  |  |  | A | B | C | B |
| Cycle characteristics |  |  |  | B | A | A | A |

TABLE 2

| | | | | | | Example 10 | Example 11 | Example 12 | Example 13 | Example 14 |
|---|---|---|---|---|---|---|---|---|---|---|
| Composition for functional layer | First organic particles | Chemical composition | | Polyfunctional ethylenically unsaturated monomer unit | Type | EDMA | EDMA | EDMA | EDMA | EDMA |
| | | | | | Proportion [mass %] | 80.8 | 80.8 | 80.8 | 80.8 | 80.8 |
| | | | | Acidic group-containing monomer unit | Type | AA | AA | AA | AA | AA |
| | | | | | Proportion [mass %] | 2.5 | 2.5 | 2.5 | 2.5 | 2.5 |
| | | | Seed particles | Monofunctional (meth)acrylic acid ester monomer unit | Type | BA | BA | BA | BA | BA |
| | | | | | Proportion [mass %] | 14.7 | 14.7 | 14.7 | 14.7 | 14.7 |
| | | | | Nitrile group-containing monomer unit | Type | AN | AN | AN | AN | AN |
| | | | | | Proportion [mass %] | 1 | 1 | 1 | 1 | 1 |
| | | | | Acidic group-containing monomer unit | Type | AA | AA | AA | AA | AA |
| | | | | | Proportion [mass %] | 1 | 1 | 1 | 1 | 1 |
| | | Volume-average particle diameter $D_1$ [nm] | | | | 200 | 200 | 200 | 200 | 200 |
| | Second organic particles | Chemical composition | | Core-shell structure | | Partial | Partial | Partial | Partial | Partial |
| | | | Core | Nitrile group-containing monomer unit | Type | AN | AN | AN | AN | AN |
| | | | | | Proportion [mass %] | 30 | 30 | 30 | 30 | 30 |
| | | | | Monofunctional (meth)acrylic acid ester monomer unit | Type | BA | BA | BA | BA | BA |
| | | | | | Proportion [mass %] | 24.6 | 24.6 | 24.6 | 24.6 | 24.6 |
| | | | | | Type | MMA | MMA | MMA | MMA | MMA |
| | | | | | Proportion [mass %] | 14 | 14 | 14 | 14 | 14 |
| | | | | Acidic group-containing monomer unit | Type | MAA | MAA | MAA | MAA | MAA |
| | | | | | Proportion [mass %] | 0.7 | 0.7 | 0.7 | 0.7 | 0.7 |
| | | | | Cross-linkable monomer unit | Type | EDMA | EDMA | EDMA | EDMA | EDMA |
| | | | | | Proportion [mass %] | 0.7 | 0.7 | 0.7 | 0.7 | 0.7 |
| | | | Shell | Aromatic monovinyl monomer unit | Type | ST | ST | ST | ST | ST |
| | | | | | Proportion [mass %] | 30 | 30 | 30 | 30 | 30 |
| | | Volume-average particle diameter $D_2$ [nm] | | | | 420 | 680 | 500 | 500 | 500 |
| | Binder | Chemical composition | | Monofunctional (meth)acrylic acid ester monomer unit | Type | 2EHA | 2EHA | 2EHA | 2EHA | 2EHA |
| | | | | | Proportion [mass %] | 70 | 70 | 70 | 70 | 70 |
| | | | | Aromatic monovinyl monomer unit | Type | ST | ST | ST | ST | ST |
| | | | | | Proportion [mass %] | 25 | 25 | 25 | 25 | 25 |
| | | | | Acidic group-containing monomer unit | Type | AA | AA | AA | AA | AA |
| | | | | | Proportion [mass %] | 3 | 3 | 3 | 3 | 3 |
| | | | | Cross-linkable monomer unit | Type | AMA | AMA | AMA | AMA | AMA |
| | | | | | Proportion [mass %] | 0.3 | 0.3 | 0.3 | 0.3 | 0.3 |
| | | | | | Type | AGE | AGE | AGE | AGE | AGE |
| | | | | | Proportion [mass %] | 1.7 | 1.7 | 1.7 | 1.7 | 1.7 |
| | Inorganic particles | | | | | — | — | — | Boehmite | Alumina |
| First organic particles:Second organic particles (mass ratio) | | | | | | 60:40 | 60:40 | 30:70 | 70:30 | 70:30 |
| Relationship between $D_1$ and $D_2$ | | | | | | $D_1 < D_2$ | $D_1 < D_2$ | $D_1 < D_2$ | $D_1 < D_2$ | $D_1 < D_2$ |
| Functional layer thickness [μm] | | | | | | 1 | 1 | 1 | 1 | 1 |
| Heat shrinkage resistance after immersion in electrolyte solution | | | | | | A | A | B | A | A |
| Adhesiveness after immersion in electrolyte solution | | | | | | A | A | A | A | A |
| Cycle characteristics | | | | | | B | B | B | A | A |

TABLE 2-continued

| | | | | | Example 15 | Example 16 | Comparative Example 1 |
|---|---|---|---|---|---|---|---|
| Composition for functional layer | First organic particles | Chemical composition | Polyfunctional ethylenically unsaturated monomer unit | Type | EDMA | EDMA | EDMA |
| | | | | Proportion [mass %] | 80.8 | 80.8 | 92 |
| | | | Acidic group-containing monomer unit | Type | AA | AA | AA |
| | | | | Proportion [mass %] | 2.5 | 2.5 | 1.9 |
| | | Seed particles | Monofunctional (meth)acrylic acid ester monomer unit | Type | BA | BA | BA |
| | | | | Proportion [mass %] | 14.7 | 14.7 | 5.1 |
| | | | Nitrile group-containing monomer unit | Type | AN | AN | AN |
| | | | | Proportion [mass %] | 1 | 1 | 0.5 |
| | | | Acidic group-containing monomer unit | Type | AA | AA | AA |
| | | | | Proportion [mass %] | 1 | 1 | 0.5 |
| | | Volume-average particle diameter $D_1$ [nm] | | | 200 | 200 | 400 |
| | Second organic particles | Core-shell structure | | | Partial | Partial | Partial |
| | | Chemical composition | Core | Nitrile group-containing monomer unit | Type | AN | AN | AN |
| | | | | Proportion [mass %] | 30 | 30 | 30 |
| | | | | Monofunctional (meth)acrylic acid ester monomer unit | Type | BA | BA | BA |
| | | | | Proportion [mass %] | 24.6 | 24.6 | 24.6 |
| | | | | Type | MMA | MMA | MMA |
| | | | | Proportion [mass %] | 14 | 14 | 14 |
| | | | | Acidic group-containing monomer unit | Type | MAA | MAA | MAA |
| | | | | Proportion [mass %] | 0.7 | 0.7 | 0.7 |
| | | | | Cross-linkable monomer unit | Type | EDMA | EDMA | EDMA |
| | | | | Proportion [mass %] | 0.7 | 0.7 | 0.7 |
| | | | Shell | Aromatic monovinyl monomer unit | Type | ST | ST | ST |
| | | | | Proportion [mass %] | 30 | 30 | 30 |
| | | Volume-average particle diameter $D_2$ [nm] | | | 500 | 150 | 500 |
| | Binder | Chemical composition | Monofunctional (meth)acrylic acid ester monomer unit | Type | 2EHA | 2EHA | 2EHA |
| | | | | Proportion [mass %] | 70 | 70 | 70 |
| | | | Aromatic monovinyl monomer unit | Type | ST | ST | ST |
| | | | | Proportion [mass %] | 25 | 25 | 25 |
| | | | Acidic group-containing monomer unit | Type | AA | AA | AA |
| | | | | Proportion [mass %] | 3 | 3 | 3 |
| | | | Cross-linkable monomer unit | Type | AMA | AMA | AMA |
| | | | | Proportion [mass %] | 0.3 | 0.3 | 0.3 |
| | | | | Type | AGE | AGE | AGE |
| | | | | Proportion [mass %] | 1.7 | 1.7 | 1.7 |
| | Inorganic particles | | | | — | — | — |
| First organic particles:Second organic particles (mass ratio) | | | | | 60:40 | 60:40 | 60:40 |
| Relationship between $D_1$ and $D_2$ | | | | | $D_1 < D_2$ | $D_1 < D_2$ | $D_1 < D_2$ |
| Functional layer thickness [μm] | | | | | 1.5 | 1 | 1 |
| Heat shrinkage resistance after immersion in electrolyte solution | | | | | A | C | C |
| Adhesiveness after immersion in electrolyte solution | | | | | A | C | A |
| Cycle characteristics | | | | | C | C | D |

It can be seen from Tables 1 and 2 that in Examples 1 to 16 in which the used composition for a functional layer contained, in a solvent, first organic particles including a polyfunctional ethylenically unsaturated monomer unit in a proportion of not less than 20 mass % and not more than 90 mass % and second organic particles including a nitrile group-containing monomer unit in a proportion of not less than 20 mass % and not more than 80 mass % and a cross-linkable monomer unit in a proportion of not less than 0.1 mass % and not more than 10 mass %, it was possible to form a functional layer having excellent heat shrinkage resistance and adhesiveness after immersion in electrolyte solution and to cause a secondary battery to display excellent cycle characteristics using a separator including the functional layer.

In contrast, it can be seen that secondary battery cycle characteristics deteriorated in Comparative Example 1 in which the used composition for a functional layer contained first organic particles in which the fractional content of a polyfunctional ethylenically unsaturated monomer unit was more than 90 mass %.

INDUSTRIAL APPLICABILITY

According to the present disclosure, it is possible to provide a composition for a non-aqueous secondary battery functional layer with which it is possible to form a functional layer that has excellent heat shrinkage resistance and adhesiveness after immersion in electrolyte solution and that can cause a non-aqueous secondary battery to display excellent cycle characteristics.

Moreover, according to the present disclosure, it is possible to provide a functional layer that has excellent heat shrinkage resistance and adhesiveness after immersion in electrolyte solution and that can cause a non-aqueous secondary battery to display excellent cycle characteristics, and also to provide a non-aqueous secondary battery including this functional layer.

REFERENCE SIGNS LIST

100 organic particle
110 core portion
110S outer surface of core portion
120 shell portion

The invention claimed is:

1. A composition for a non-aqueous secondary battery functional layer comprising first organic particles, second organic particles, and a solvent, wherein
the first organic particles include a polyfunctional ethylenically unsaturated monomer unit in a proportion of not less than 20 mass % and not more than 90 mass %,
the second organic particles include a nitrile group-containing monomer unit in a proportion of not less than 20 mass % and not more than 80 mass % and a cross-linkable monomer unit in a proportion of not less than 0.1 mass % and not more than 10 mass % and
the first organic particles constitute a proportion of not less than 40 mass % and not more than 70 mass % among a total of the first organic particles and the second organic particles.

2. The composition for a non-aqueous secondary battery functional layer according to claim 1, wherein a volume-average particle diameter $D_1$ of the first organic particles is smaller than a volume-average particle diameter $D_2$ of the second organic particles.

3. The composition for a non-aqueous secondary battery functional layer according to claim 1, wherein the first organic particles have a volume-average particle diameter $D_1$ of not less than 50 nm and not more than 370 nm.

4. The composition for a non-aqueous secondary battery functional layer according to claim 1, wherein the polyfunctional ethylenically unsaturated monomer unit is a polyfunctional (meth)acrylic acid ester monomer unit.

5. The composition for a non-aqueous secondary battery functional layer according to claim 1, wherein the second organic particles have a volume-average particle diameter $D_2$ of not less than 400 nm and not more than 1,000 nm.

6. The composition for a non-aqueous secondary battery functional layer according to claim 1, wherein the second organic particles have a core-shell structure including a core portion and a shell portion that at least partially covers an outer surface of the core portion.

7. The composition for a non-aqueous secondary battery functional layer according to claim 1, further comprising inorganic particles.

8. A functional layer for a non-aqueous secondary battery formed using the composition for a non-aqueous secondary battery functional layer according to claim 1.

9. The functional layer for a non-aqueous secondary battery according to claim 8, having a thickness of not less than 0.5 μm and not more than 1.5 μm.

10. A non-aqueous secondary battery comprising the functional layer for a non-aqueous secondary battery according to claim 8.

* * * * *